(12) United States Patent
Ellis et al.

(10) Patent No.: US 9,170,941 B2
(45) Date of Patent: Oct. 27, 2015

(54) DATA HARDENING IN A STORAGE SYSTEM

(71) Applicant: SanDisk Enterprise IP LLC, Dallas, TX (US)

(72) Inventors: Robert W. Ellis, Phoenix, AZ (US); Lace J. Herman, Firestone, CO (US); Bobby Ray Southerland, Longmont, CO (US)

(73) Assignee: SANDISK ENTERPRISES IP LLC, Milpitas, CA (US)

( * ) Notice: Subject to any disclaimer, the term of this patent is extended or adjusted under 35 U.S.C. 154(b) by 24 days.

(21) Appl. No.: 14/081,992

(22) Filed: Nov. 15, 2013

(65) Prior Publication Data

US 2014/0304454 A1    Oct. 9, 2014

Related U.S. Application Data

(60) Provisional application No. 61/809,247, filed on Apr. 5, 2013.

(51) Int. Cl.
*G06F 12/08* (2006.01)
*G06F 12/02* (2006.01)
(Continued)

(52) U.S. Cl.
CPC ........ *G06F 12/0802* (2013.01); *G06F 11/1004* (2013.01); *G06F 11/1441* (2013.01); *G06F 12/0246* (2013.01); *G06F 12/0804* (2013.01); *G06F 12/0868* (2013.01); *G06F 12/0897* (2013.01); *G06F 2212/1036* (2013.01); *G06F 2212/214* (2013.01); *G06F 2212/262* (2013.01); *G06F 2212/281* (2013.01); *G06F 2212/311* (2013.01); *G06F 2212/7201* (2013.01)

(58) Field of Classification Search
None
See application file for complete search history.

(56) References Cited

U.S. PATENT DOCUMENTS

| 4,048,481 A | 9/1977 | Bailey, Jr. et al. |
| 4,839,587 A | 6/1989 | Flatley et al. |

(Continued)

FOREIGN PATENT DOCUMENTS

| EP | 1465203 A1 | 10/2004 |
| EP | 1 956 489 A2 | 8/2008 |

(Continued)

OTHER PUBLICATIONS

Cooke, "Introduction to Flash Memory (T1A)," Flash Memory Summit, Aug. 22, 2008, Micron Technology, Inc., 102 pages.

(Continued)

*Primary Examiner* — Ernest Unelus
*Assistant Examiner* — Dayton Lewis-Taylor
(74) *Attorney, Agent, or Firm* — Morgan, Lewis & Bockius LLP

(57) ABSTRACT

A storage system, and a method of data hardening in the storage system, including: a de-glitch module configured for a detection of a power failure event; a write page module, coupled to the de-glitch module, the write page module configured for an execution of a cache write command based on the power failure event to send a cache page from a cache memory to a storage channel controller, wherein the cache memory is a volatile memory; and a signal empty module, coupled to the write page module, the signal empty module configured for a generation of a sleep signal to shut down a host bus adapter, wherein the host bus adapter interfaces with the storage channel controller to write the cache page back to the cache memory upon a power up of the host bus adapter and the storage channel controller.

14 Claims, 5 Drawing Sheets

(51) Int. Cl.
*G06F 11/10* (2006.01)
*G06F 11/14* (2006.01)

(56) References Cited

U.S. PATENT DOCUMENTS

| | | | |
|---|---|---|---|
| 4,916,652 A | 4/1990 | Schwarz et al. |
| 5,034,744 A | 7/1991 | Obinata |
| 5,210,854 A | 5/1993 | Beaverton et al. |
| 5,311,395 A | 5/1994 | McGaha et al. |
| 5,450,354 A | 9/1995 | Sawada et al. |
| 5,479,638 A | 12/1995 | Assar et al. |
| 5,519,847 A | 5/1996 | Fandrich et al. |
| 5,530,705 A | 6/1996 | Malone |
| 5,537,555 A | 7/1996 | Landry |
| 5,551,003 A | 8/1996 | Mattson et al. |
| 5,657,332 A | 8/1997 | Auclair et al. |
| 5,666,114 A | 9/1997 | Brodie et al. |
| 5,708,849 A | 1/1998 | Coke et al. |
| 5,784,174 A | 7/1998 | Fujino et al. |
| 5,790,828 A | 8/1998 | Jost |
| 5,930,504 A | 7/1999 | Gabel |
| 5,943,692 A | 8/1999 | Marberg et al. |
| 5,949,785 A | 9/1999 | Beasley |
| 5,963,893 A | 10/1999 | Halstead, Jr. et al. |
| 5,982,664 A | 11/1999 | Watanabe |
| 6,000,006 A | 12/1999 | Bruce et al. |
| 6,016,560 A | 1/2000 | Wada et al. |
| 6,018,304 A | 1/2000 | Bessios |
| 6,034,897 A | 3/2000 | Estakhri et al. |
| 6,069,827 A | 5/2000 | Sinclair |
| 6,070,074 A | 5/2000 | Perahia et al. |
| 6,091,652 A | 7/2000 | Haehn et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,275,436 B1 | 8/2001 | Tobita et al. |
| 6,295,592 B1 | 9/2001 | Jeddeloh et al. |
| 6,311,263 B1 | 10/2001 | Barlow et al. |
| 6,345,367 B1 | 2/2002 | Sinclair |
| 6,356,447 B2 | 3/2002 | Scafidi |
| 6,381,670 B1 | 4/2002 | Lee et al. |
| 6,412,080 B1 | 6/2002 | Fleming et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,678,788 B1 | 1/2004 | O'Connell |
| 6,728,913 B1 | 4/2004 | Parker |
| 6,757,768 B1 | 6/2004 | Potter et al. |
| 6,763,424 B2 | 7/2004 | Conley |
| 6,775,792 B2 | 8/2004 | Ulrich et al. |
| 6,778,387 B2 | 8/2004 | Fairchild |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,850,443 B2 | 2/2005 | Lofgren et al. |
| 6,854,070 B2 | 2/2005 | Johnson et al. |
| 6,871,257 B2 | 3/2005 | Conley et al. |
| 6,871,304 B2 | 3/2005 | Hadjihassan et al. |
| 6,895,464 B2 | 5/2005 | Chow et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,032,123 B2 | 4/2006 | Kane et al. |
| 7,043,505 B1 | 5/2006 | Teague et al. |
| 7,082,495 B2 | 7/2006 | DeWhitt et al. |
| 7,100,002 B2 | 8/2006 | Shrader et al. |
| 7,107,389 B2 | 9/2006 | Inagaki et al. |
| 7,111,293 B1 | 9/2006 | Hersh et al. |
| 7,139,864 B2 | 11/2006 | Bennett et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,233,497 B2 | 6/2007 | Simon et al. |
| 7,243,186 B2 | 7/2007 | Liang et al. |
| 7,298,888 B2 | 11/2007 | Hamar |
| 7,328,377 B1 | 2/2008 | Lewis et al. |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,571,277 B2 | 8/2009 | Mizushima |
| 7,574,554 B2 | 8/2009 | Tanaka et al. |
| 7,596,643 B2 | 9/2009 | Merry et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,681,106 B2 | 3/2010 | Jarrar et al. |
| 7,685,494 B1 | 3/2010 | Varnica et al. |
| 7,693,422 B2 | 4/2010 | Alicherry et al. |
| 7,707,481 B2 | 4/2010 | Kirschner et al. |
| 7,738,502 B2 | 6/2010 | Chang et al. |
| 7,743,216 B2 | 6/2010 | Lubbers et al. |
| 7,761,655 B2 | 7/2010 | Mizushima et al. |
| 7,761,681 B2 | 7/2010 | Jewell et al. |
| 7,774,390 B2 | 8/2010 | Shin |
| 7,818,525 B1 | 10/2010 | Frost et al. |
| 7,827,348 B2 | 11/2010 | Lee et al. |
| 7,830,164 B2 | 11/2010 | Earle et al. |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich |
| 7,979,614 B1 | 7/2011 | Yang |
| 7,996,642 B1 | 8/2011 | Smith |
| 8,001,135 B2 | 8/2011 | Fume et al. |
| 8,006,161 B2 | 8/2011 | Lestable et al. |
| 8,010,738 B1 | 8/2011 | Chilton et al. |
| 8,028,123 B2 | 9/2011 | Kilzer et al. |
| 8,032,724 B1 | 10/2011 | Smith |
| 8,046,645 B2 | 10/2011 | Hsu et al. |
| 8,051,241 B2 | 11/2011 | Feldman et al. |
| 8,069,390 B2 | 11/2011 | Lin |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,190,967 B2 | 5/2012 | Hong et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |

(56) References Cited

U.S. PATENT DOCUMENTS

| | | |
|---|---|---|
| 8,245,101 B2 | 8/2012 | Olbrich et al. |
| 8,250,621 B2 | 8/2012 | Cha |
| 8,254,172 B1 | 8/2012 | Kan |
| 8,254,181 B2 | 8/2012 | Hwang et al. |
| 8,259,506 B1 | 9/2012 | Sommer et al. |
| 8,289,801 B2 | 10/2012 | Smith et al. |
| 8,296,534 B1 | 10/2012 | Gupta et al. |
| 8,312,349 B2 | 11/2012 | Reche et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,815 B2 | 2/2013 | Hutchison et al. |
| 8,386,860 B2 | 2/2013 | Tseng et al. |
| 8,407,409 B2 | 3/2013 | Kawaguchi |
| 8,412,985 B1 | 4/2013 | Bowers et al. |
| 8,464,106 B2 | 6/2013 | Filor et al. |
| 8,503,238 B1 | 8/2013 | Wu et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 | 4/2014 | Raju et al. |
| 8,832,506 B2 | 9/2014 | Griffin et al. |
| 8,984,216 B2 | 3/2015 | Fillingim |
| 2002/0024846 A1 | 2/2002 | Kawahara et al. |
| 2002/0056025 A1 | 5/2002 | Qiu et al. |
| 2002/0083299 A1 | 6/2002 | Van Huben et al. |
| 2002/0152305 A1 | 10/2002 | Jackson et al. |
| 2002/0156891 A1 | 10/2002 | Ulrich et al. |
| 2002/0159285 A1 | 10/2002 | Morley et al. |
| 2002/0162075 A1 | 10/2002 | Talagala et al. |
| 2002/0165896 A1 | 11/2002 | Kim |
| 2003/0033308 A1 | 2/2003 | Patel et al. |
| 2003/0041299 A1 | 2/2003 | Kanazawa et al. |
| 2003/0043829 A1 | 3/2003 | Rashid |
| 2003/0046603 A1 | 3/2003 | Harari et al. |
| 2003/0074592 A1 | 4/2003 | Hasegawa |
| 2003/0088805 A1 | 5/2003 | Majni et al. |
| 2003/0093628 A1 | 5/2003 | Matter et al. |
| 2003/0163633 A1 | 8/2003 | Aasheim et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0073829 A1 | 4/2004 | Olarig |
| 2004/0080985 A1 | 4/2004 | Chang et al. |
| 2004/0088511 A1 | 5/2004 | Bacon et al. |
| 2004/0153902 A1 | 8/2004 | Machado et al. |
| 2004/0181734 A1 | 9/2004 | Saliba |
| 2004/0199714 A1 | 10/2004 | Estakhri et al. |
| 2004/0237018 A1 | 11/2004 | Riley |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0076102 A1 | 4/2005 | Chen et al. |
| 2005/0114587 A1 | 5/2005 | Chou et al. |
| 2005/0144516 A1 | 6/2005 | Gonzalez et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0039196 A1 | 2/2006 | Gorobets et al. |
| 2006/0053246 A1 | 3/2006 | Lee |
| 2006/0080505 A1 | 4/2006 | Arai et al. |
| 2006/0085671 A1 | 4/2006 | Majni et al. |
| 2006/0136570 A1 | 6/2006 | Pandya |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0156177 A1 | 7/2006 | Kottapalli et al. |
| 2006/0195650 A1 | 8/2006 | Su et al. |
| 2006/0253641 A1 | 11/2006 | Gatzemeier et al. |
| 2006/0256624 A1 | 11/2006 | Eggleston et al. |
| 2006/0259528 A1 | 11/2006 | Dussud et al. |
| 2006/0282644 A1 | 12/2006 | Wong |
| 2006/0294574 A1 | 12/2006 | Cha |
| 2007/0011413 A1 | 1/2007 | Nonaka et al. |
| 2007/0050536 A1 | 3/2007 | Kolokowsky |
| 2007/0058446 A1 | 3/2007 | Hwang et al. |
| 2007/0061511 A1 | 3/2007 | Faber |
| 2007/0061597 A1 | 3/2007 | Holtzman et al. |
| 2007/0067598 A1 | 3/2007 | Fujimoto |
| 2007/0076479 A1 | 4/2007 | Kim et al. |
| 2007/0079152 A1 | 4/2007 | Winick et al. |
| 2007/0081408 A1 | 4/2007 | Kwon et al. |
| 2007/0083697 A1 | 4/2007 | Birrell et al. |
| 2007/0083779 A1 | 4/2007 | Misaka et al. |
| 2007/0113019 A1 | 5/2007 | Beukema |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0208901 A1 | 9/2007 | Purcell et al. |
| 2007/0226592 A1 | 9/2007 | Radke |
| 2007/0234004 A1 | 10/2007 | Oshima et al. |
| 2007/0234143 A1 | 10/2007 | Kim |
| 2007/0245061 A1 | 10/2007 | Harriman |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2007/0277036 A1 | 11/2007 | Chamberlain et al. |
| 2007/0291556 A1 | 12/2007 | Kamei |
| 2007/0294496 A1 | 12/2007 | Goss et al. |
| 2007/0300130 A1 | 12/2007 | Gorobets |
| 2008/0019182 A1 | 1/2008 | Yanagidaira et al. |
| 2008/0022163 A1 | 1/2008 | Tanaka et al. |
| 2008/0028246 A1 | 1/2008 | Witham |
| 2008/0046630 A1 | 2/2008 | Lasser |
| 2008/0052446 A1 | 2/2008 | Lasser et al. |
| 2008/0077841 A1 | 3/2008 | Gonzalez et al. |
| 2008/0077937 A1 | 3/2008 | Shin et al. |
| 2008/0082736 A1 | 4/2008 | Chow et al. |
| 2008/0086677 A1 | 4/2008 | Yang et al. |
| 2008/0126720 A1 | 5/2008 | Danilak |
| 2008/0144371 A1 | 6/2008 | Yeh et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0183918 A1 | 7/2008 | Dhokia et al. |
| 2008/0189588 A1 | 8/2008 | Tanaka et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0263289 A1 | 10/2008 | Hosoya et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313505 A1 | 12/2008 | Lee et al. |
| 2009/0003058 A1 | 1/2009 | Kang |
| 2009/0006900 A1 | 1/2009 | Lastras-Montano et al. |
| 2009/0019321 A1 | 1/2009 | Radke |
| 2009/0037652 A1 | 2/2009 | Yu et al. |
| 2009/0070651 A1 | 3/2009 | Diggs et al. |
| 2009/0083587 A1 | 3/2009 | Ng et al. |
| 2009/0089485 A1 | 4/2009 | Yeh |

(56) References Cited

U.S. PATENT DOCUMENTS

| | | |
|---|---|---|
| 2009/0091990 A1 | 4/2009 | Park et al. |
| 2009/0109786 A1 | 4/2009 | Ye et al. |
| 2009/0125670 A1 | 5/2009 | Keays |
| 2009/0138654 A1 | 5/2009 | Sutardja |
| 2009/0144598 A1 | 6/2009 | Yoon et al. |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0179707 A1 | 7/2009 | Higashino |
| 2009/0193058 A1 | 7/2009 | Reid |
| 2009/0207660 A1 | 8/2009 | Hwang et al. |
| 2009/0222708 A1 | 9/2009 | Yamaga |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0296466 A1 | 12/2009 | Kim et al. |
| 2009/0296486 A1 | 12/2009 | Kim et al. |
| 2009/0300238 A1 | 12/2009 | Panabaker et al. |
| 2009/0319864 A1 | 12/2009 | Shrader |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0061151 A1 | 3/2010 | Miwa et al. |
| 2010/0103737 A1 | 4/2010 | Park |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0161936 A1 | 6/2010 | Royer et al. |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0199125 A1 | 8/2010 | Reche |
| 2010/0202196 A1 | 8/2010 | Lee et al. |
| 2010/0208521 A1 | 8/2010 | Kim et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0250830 A1 | 9/2010 | Stenfort |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0083060 A1 | 4/2011 | Sakurada et al. |
| 2011/0099342 A1 | 4/2011 | Ozdemir |
| 2011/0107144 A1 | 5/2011 | Ohara |
| 2011/0113281 A1 | 5/2011 | Zhang et al. |
| 2011/0131365 A1 | 6/2011 | Zhang et al. |
| 2011/0131444 A1 | 6/2011 | Buch et al. |
| 2011/0131447 A1 | 6/2011 | Prakash et al. |
| 2011/0132000 A1 | 6/2011 | Deane et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0173378 A1 | 7/2011 | Filor et al. |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0205823 A1 | 8/2011 | Hemink et al. |
| 2011/0209032 A1 | 8/2011 | Choi et al. |
| 2011/0213920 A1 | 9/2011 | Frost et al. |
| 2011/0228601 A1 | 9/2011 | Olbrich et al. |
| 2011/0231600 A1 | 9/2011 | Tanaka et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0079348 A1 | 3/2012 | Naeimi |
| 2012/0096217 A1 | 4/2012 | Son et al. |
| 2012/0110250 A1 | 5/2012 | Sabbag et al. |
| 2012/0124046 A1 | 5/2012 | Provenzano |
| 2012/0124273 A1 | 5/2012 | Goss et al. |
| 2012/0151253 A1 | 6/2012 | Horn |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0195126 A1 | 8/2012 | Roohparvar |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0239976 A1 | 9/2012 | Cometti et al. |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0073788 A1 | 3/2013 | Post et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0238833 A1 | 9/2013 | Vogan et al. |
| 2013/0265825 A1 | 10/2013 | Lassa |
| 2013/0332791 A1 | 12/2013 | Chu |
| 2014/0036589 A1 | 2/2014 | Parthasarathy et al. |
| 2014/0059359 A1 | 2/2014 | Bahirat |
| 2014/0108891 A1 | 4/2014 | Strasser et al. |
| 2014/0129874 A1 | 5/2014 | Zaltsman et al. |

(56) References Cited

U.S. PATENT DOCUMENTS

| | | | |
|---|---|---|---|
| 2014/0158525 A1 | 6/2014 | Greene | |
| 2014/0208174 A1 | 7/2014 | Ellis et al. | |
| 2014/0372777 A1 | 12/2014 | Reller et al. | |

FOREIGN PATENT DOCUMENTS

| | | | |
|---|---|---|---|
| EP | 1 990 921 A2 | 11/2008 | |
| EP | 2 498 259 A2 | 9/2012 | |
| JP | 2002-532806 | 10/2002 | |
| JP | 2012129859 A | 7/2012 | |
| WO | WO 2007/036834 | 4/2007 | |
| WO | WO 2007/080586 | 7/2007 | |
| WO | WO 2008/121553 | 10/2008 | |
| WO | WO 2008/121577 | 10/2008 | |
| WO | WO 2009/028281 | 3/2009 | |
| WO | WO 2009/032945 | 3/2009 | |
| WO | WO 2009/042298 A1 | 4/2009 | |
| WO | WO 2009/058140 | 5/2009 | |
| WO | WO 2009/084724 | 7/2009 | |
| WO | WO 2009/134576 | 11/2009 | |
| WO | WO 2011/156466 A2 | 12/2011 | |

OTHER PUBLICATIONS

Gal et al., "Algotithms and Data Structures for Flash Memories," ACM Computing Surveys, Jun. 2005, vol. 37, No. 2, 30 pages.
IBM Corporation, "Systems Management, Work Management," Version 5, Release 4, 9th Edition, Feb. 2006, pp. 1-21.
O'Brien, "SMART Storage Systems Optimus SAS Enterprise SSD Review," SMART Storage Systems, Oct. 9, 2012, 44 pages.
Spanjer, "Flash Management—Why and How?" Smart Modular Technologies, Nov. 2009, http://www.scantec.de/fileadmin/pdf/Smart_Modular/Flash-Management.pdf, 14 pages.
Texas Instruments, "Power Management IC for Digital Set Top Boxes," SLVSA10A, Sep. 2009, pp. 1-22.
International Search Report and Written Opinion dated Dec. 20, 2013, received in PCT/US2013/045282, which corresponds to U.S. Appl. No. 13/493,949, 7 pages (Ellis).
International Search Report and Written Opinion dated Jun. 12, 2014, received in PCT/US2014/018972, which corresponds to U.S. Appl. No. 13/779,352, 12 pages (Schmier).
International Search Report and Written Opinion dated May 14, 2014, received in International Patent Application No. PCT/US2014/017168, which corresponds to U.S. Appl. No. 14/076,115, 6 pages (Fitzpatrick).
International Search Report and Written Opinion dated May 14, 2014, received in International Patent Application No. PCT/US2014/017169, which corresponds to U.S. Appl. No. 14/076,148, 6 pages (Fitzpatrick).
International Search Report and Written Opinion dated Nov. 7, 2014, received in International Patent Application No. PCT/US2014/049732, which corresponds to U.S. Appl. No. 14/334,350, 13 pages (Fitzpatrick).
International Search Report and Written Opinion dated Oct. 17, 2014, received in International Patent Application No. PCT/US2014/049734, which corresponds to U.S. Appl. No. 14/332,259, 8 pages (Higgins).
International Search Report and Written Opinion dated Oct. 23, 2014, received in International Patent Application No. PCT/US2014/049736, which corresponds to U.S. Appl. No. 14/446,249, 8 pages (Fitzpatrick).
International Search Report and Written Opinion dated Nov. 5, 2014, received in International Patent Application No. PCT/US2014/049282, which corresponds to U.S. Appl. No. 14/957,407, 12 pages (Fitzpatrick).
Barr, Introduction to Watchdog Timers, Oct. 2001, 3 pgs.
Canim, Buffered Bloom ilters on Solid State Storage, ADMS*10, Singapore, Sep. 13-17, 2010, 8 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
McLean, Information Technology-AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 8 pgs.
Pliant Technology, International Search Report / Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 7 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4,2013, 14 pgs.
SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
SanDisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.

(56) References Cited

OTHER PUBLICATIONS

Watchdog Timer and Power Savin Modes, Microchip Technology Inc., 2005, 14 pgs.
Zeidman, 1999 Verilog Designer's Library, 9 pgs.
Ulinktech, "ATA Command Table (in Alphabetic Order)," Feb. 6, 2011, https://web.archive.org/web/20110206060820/http://www.ulinktech.com/downloads/AT, 6 pages.
International Search Report and Written Opinion dated Aug. 22, 2014, received in International Patent Application No. PCT/US2014/032978, which corresponds to U.S. Appl. No. 14/081,992, 10 pages (Ellis).
International Search Report dated Mar. 25, 2014, received in International Patent Application No. PCT/US2013/072400, which corresponds to U.S. Appl. No. 13/690,337, 3 pages (Ellis).
Invitation to Pay Additional Fees dated Jul. 25, 2014, received in International Patent Application No. PCT/US2014/021290, which corresponds to U.S. Appl. No. 13/791,797, 8 pages (Dean).
International Search Report and Written Opinion dated Jul. 31, 2014, received in International Patent Application No. PCT/US2014/031465, which corresponds to U.S. Appl. No. 13/851,928, 13 pages (Ellis).
International Search Report and Written Opinion dated Jul. 31, 2014, received in International Patent Application No. PCT/US2014/033876, which corresponds to U.S. Appl. No. 13/861,326, 9 pages (Fitzpatrick).
Narayanan: et al., "Migrating Server Storage to SSDs: Analysis of Tradeoffs," Computer Systems, Apr. 2009, 12 pages.
Shiraz et al., "Block Aging Prevention Technique (BAP) for Flash Based Solid State Disks," 7th International Conference on Emerging Technologies (ICET), Sep. 5, 2011, 6 pages.
Tai et al, "Prolongation of Lifetime and the Evaluation Method of Dependable SSD," 25 International Symposium on Defect and Fault Tolerance in VLSI Systems, 2010, NJ, USA, 8 pages.
Tseng et al., "Understanding the impact of Power Loss on Flash Memory," DAC'11, Jun. 5-10, 2011, San Diego, California, 6 pages.
Yimo et al., "WeLe-RAID: A SSD-Based RAID for System Endurance and Performance," Jan. 2011, Network and Parallel Computing, Springer, 14 pages.
International Search Report and Written Opinion dated Jan. 9. 2015, received in International Patent Application No. PCT/US2014/049731, which corresponds to U.S. Appl. No. 14/334,324, 9 pages (Fitzpatrick).
International Search Report and Written Opinion dated Feb. 18, 2015, received in International Patent Application No. PCT/US2014/065401, whith corresponds to U.S Appl. No. 14/082,031, 9 pages (Higgins).
International Search Report dated Apr. 15, 2014, received in International Patent Application No. PCT/US2013/078340, which corresponds to U.S. Appl. No. 13/746,542, 11 pages (Ellis).

DATA HARDENING IN A STORAGE SYSTEM

CROSS-REFERENCE TO RELATED APPLICATION(S)

This application claims the benefit of U.S. Provisional Patent Application Ser. No. 61/809,247 filed Apr. 5, 2013, which is incorporated herein by reference in its entirety.

TECHNICAL FIELD

The present disclosure relates generally to a storage system and more particularly to data management in a storage system.

BACKGROUND ART

Various forms of long-term storage in computer systems include, other than electromechanical hard disks, non-volatile storage rooted in semiconductor or other memory technology. NOT-AND (NAND) flash memory is one form of non-volatile memory used in solid-state storage devices. In a common configuration of flash memory, the memory cells are arranged in typical row and column fashion with circuitry for accessing individual cells. The data store elements (e.g., transistors) of those memory cells are configured to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is data integrity since it does not have adequate data retention to increase data integrity for data hardening.

Thus, a need still remains for better data management devices that can optimize operations and prolong the life of storage devices. In view of the ever-increasing commercial competitive pressures, along with growing consumer expectations and the diminishing opportunities for meaningful product differentiation in the marketplace, it is important to find answers for these problems.

Prior developments have long sought but not found optimal solutions to these problems. Hence, there remains a need that has long eluded those skilled in the art.

SUMMARY

The present disclosure covers various embodiments of a storage system and a method of data hardening in the storage system. In one implementation, the storage system includes a module for sending a cache page from an adapter cache memory to a storage channel controller. The storage system also includes a module for generating a sleep signal to shut down a host bus adapter, which interfaces with the storage channel controller to write the cache page back to the adapter cache memory upon powering up the host bus adapter and the storage channel controller.

Certain embodiments have other steps or elements in addition to or in place of those mentioned above. The steps or elements will become apparent to those skilled in the art from a reading of the following detailed description when taken with reference to the accompanying drawings. The embodiments described herein are illustrative and should not limit the scope of the claimed invention as recited in the claims.

DETAILED DESCRIPTION

Figure 1:
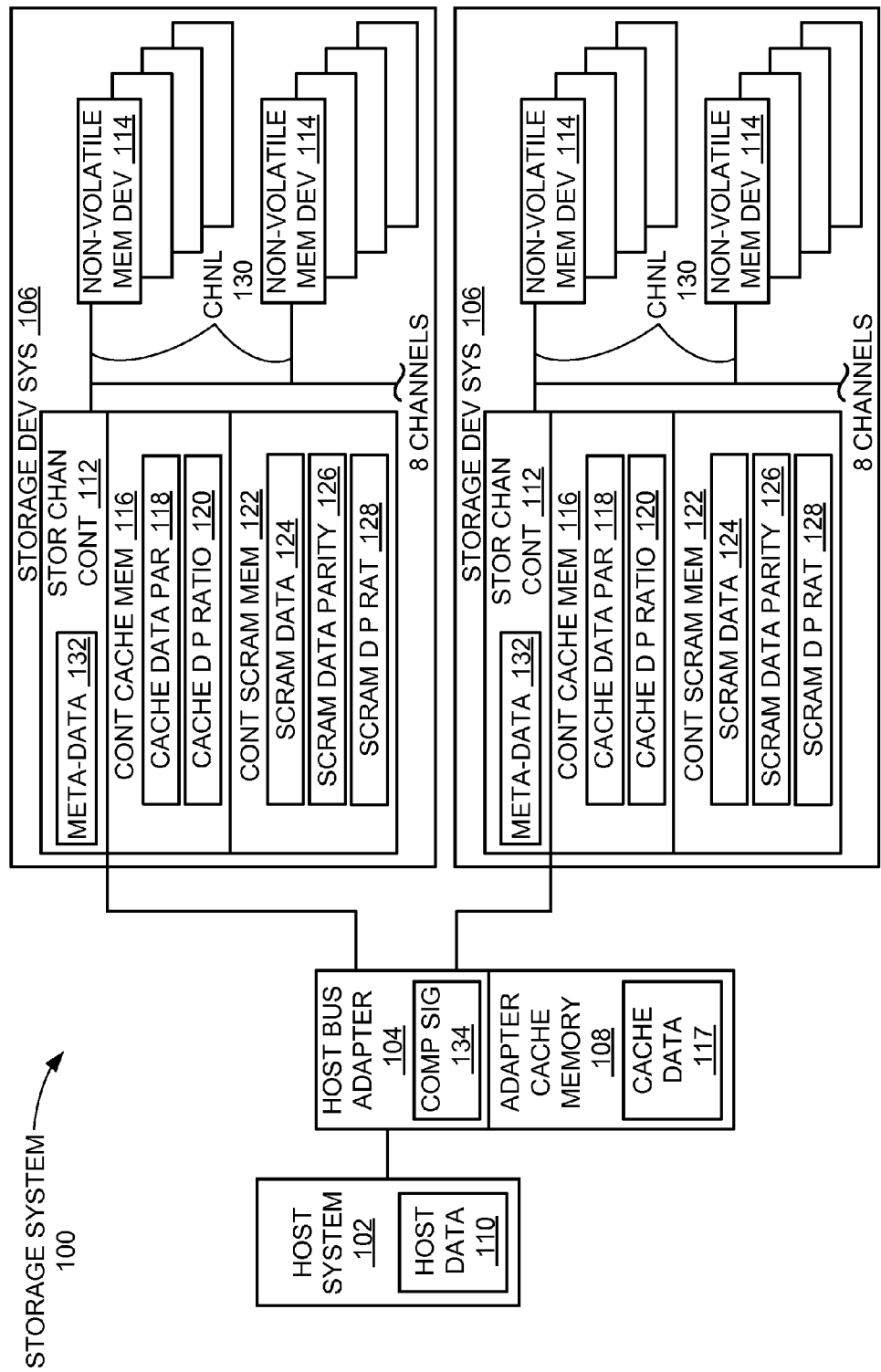
FIG. 1 is a storage system with data hardening in an embodiment of the present disclosure.

The following embodiments are described in sufficient detail to enable those skilled in the art to make and use the invention. It is to be understood that other embodiments would be evident based on the present disclosure, and that system, process, or mechanical changes may be made without departing from the scope of the present disclosure.

In the following description, numerous specific details are given to provide a thorough understanding of the invention. However, it will be apparent that the invention may be practiced without these specific details. In order to avoid obscuring the present disclosure, some well-known circuits, system configurations, and process steps are not disclosed in detail.

The drawings showing embodiments of the system may be drawn not to scale.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

Various embodiments described here include a new approach for data hardening in a storage system. This approach includes a method including: detecting a power failure event; executing a cache write command based on the power failure event to send a cache page from a cache memory to a storage channel controller, wherein the cache memory is a volatile memory; and generating a sleep signal to shut down a host bus adapter, wherein the host bus adapter interfaces with the storage channel controller to write the cache page back to the cache memory upon a power up of the host bus adapter and the storage channel controller.

Various embodiments described here also include a storage system including: a de-glitch module configured for a detection of a power failure event; a write page module, coupled to the de-glitch module, the write page module configured for an execution of a cache write command based on the power failure event to send a cache page from a cache memory to a storage channel controller, wherein the cache memory is a volatile memory; and a signal empty module, coupled to the write page module, the signal empty module configured for a generation of a sleep signal to shut down a host bus adapter, wherein the host bus adapter interfaces with the storage channel controller to write the cache page back to the cache memory upon a power up of the host bus adapter and the storage channel controller.

As higher and higher performance is required from storage devices, cache type memories are being added to the storage devices. Additionally, some of memory units holding host write data are not directly controlled by end storage devices.

In this case, redundant array of independent or inexpensive disks (RAID) engineers and data aggregators do not have a non-volatile storage devices (NVSTORE) attached to them for purpose of data hardening. Today, the responsibility falls on a host system to either tag data as volatile or be responsible for backing up this storage. The term "data hardening" referred to herein is defined as a process of transferring and storing data that has been cached or temporarily stored in a volatile memory to a non-volatile memory.

Various components of a storage system have volatile memory that is used to store data to be written to a non-volatile storage device. The volatile memory loses the data when power is removed. Each component must decide when to notify a data sender when that data operation is complete. A general practice is that notification of operation complete implies the data can be retrieved following a loss of power.

Some components that do not have a method to save the data during the loss of power will delay notification of operation complete until the data has been written to a non-volatile memory. This method significantly reduces performance of the storage system.

Some components that do not have a method to save the data during loss of power sends notification of operation complete before the data has been written to non-volatile memory. This method improves performance but relies on the non-occurrence of power loss and the capability of the data sender to recover from lost data.

Some components implement emergency power supplies that provide enough power to save the data to non-volatile memory upon detection of power loss. These components can notify the data sender of operation complete prior to the data being written to the non-volatile memory because the emergency power supply guarantees the data will be saved to the non-volatile memory. This method provides improved performance without worry of lost data. However, the emergency power supply increases cost of the storage system.

Referring now to FIG. 1, therein is shown a storage system 100 with data hardening in an embodiment of the present disclosure. The storage system 100 includes a method for hardening distributed write cache.

The storage system 100 includes a host system 102 communicating with a host bus adapter 104 (HBA) for writing data to and from a number of storage device systems 106. The host system 102 communicates with the host bus adapter 104 via any host interfaces including double-data rate (DDR) interface or any other connectivity mechanisms. The term "host bus adapter" (HBA) referred to herein is defined as a device that is between the host system and one or more storage devices.

The host bus adapter 104 includes a host RAID engine. The host bus adapter 104 interfaces with an adapter cache memory 108 for storing and retrieving host data 110 received from and sent to the host system 102, respectively. The adapter cache memory 108 is used for storing the host data 110 that the host bus adapter 104 receives from the host system 102.

The adapter cache memory 108 can be integrated in the host bus adapter 104 or external to the host bus adapter 104. The adapter cache memory 108 is volatile and so does not include non-volatile memories. For example, the adapter cache memory 108 can include 512 kilobytes (KB) or any other storage capacities.

The host bus adapter 104 communicates with the storage device systems 106 via any computer bus interfaces that connect host bus adapters to mass storage devices. For example, the computer bus interfaces can include Serial Advanced Technology (AT) Attachment (SATA) or any other computer storage device interfaces.

For illustrative purposes, there are two of the storage device systems 106, denoted as SSD-A and SSD-B, depicted in a high-level architecture of a typical 2-storage device system, although it is understood that the storage system 100 can include any number of the storage device systems 106. For example, there can be only one storage device or one of the storage device systems 106 connected to the host bus adapter 104.

Each of the storage device systems 106 includes a main memory controller or storage channel controller 112 and a number of non-volatile memory devices 114. The storage channel controller 112 interfaces with a controller cache memory 116 for storing cache data 117, which is the host data 110 that the host bus adapter 104 reads from the adapter cache memory 108 and sends to the storage channel controller 112 during normal operations. The normal operations are processes that transfer data in response to the host system 102 without any power interruption. The normal operations are not performed for the data hardening.

The controller cache memory 116 can be used to store a cache data parity 118, which is used for error detection of the host data 110 stored in the controller cache memory 116. For example, the cache data parity 118 can typically be RAID-1, RAID-3, and other RAID implementation or any parity protection methods.

A cache data parity ratio 120 can be any ratios. The cache data parity ratio 120 is a ratio of a number of pages of the host data 110 stored in the controller cache memory 116 to a number of pages of the cache data parity 118 stored in the controller cache memory 116. For example, the cache data parity ratio 120 can be 31:1. In this example, for every thirty-one pages of the host data 110 stored in the controller cache memory 116, there is one page of the cache data parity 118 stored in the controller cache memory 116.

The term "page" referred to herein is defined as a memory component within an erase block that is programmed as an individual unit. The page is a smallest group of data bytes that are read from or written to in an erase block.

The storage channel controller 112 interfaces with a controller scram memory 122 for storing scram data 124, which is the cache data 117 that the storage channel controller 112 receives from the host bus adapter 104. The storage channel controller 112 stores the scram data 124 in response to the host bus adapter 104 sending the cache data 117 to the storage channel controller 112, an emergency shutdown procedure including SCRAM, or a combination thereof.

The scram data 124 in the controller scram memory 122 is to be subsequently stored in the non-volatile memory devices 114. The controller scram memory 122 can be used to store a scram data parity 126, which is used for error detection of the scram data 124. The term "Safety Control Rod Axe Man" (SCRAM) referred to herein is defined as an emergency shutdown procedure that occurs upon detecting a power failure. The procedure includes a data hardening for storing data in a cache memory to a non-volatile memory device.

A scram data parity ratio 128 can be any ratios. The scram data parity ratio 128 is a ratio of a number of pages of the scram data 124 to a number of pages of the scram data parity 126. The scram data parity ratio 128 is less than the cache data parity ratio 120 because the scram data 124 is more important than the cache data 117 stored in the controller cache memory 116. For example, the scram data parity ratio 128 can be 8:1, which means that for every eight pages of the scram data 124 stored in the controller cache memory 116, there is one page of the cache data parity 118 stored in the controller cache memory 116.

The controller cache memory 116 can be integrated in the storage channel controller 112 or external to the storage channel controller 112. The controller cache memory 116 can include any memory devices including volatile and nonvolatile memory devices. For example, the controller cache memory 116 can include 768 KB or any other storage capacities.

Also for example, the controller cache memory 116 can keep track of 192 4 KB-page credits, wherein each of the credits indicates that a page of 4 KB of the cache data 117 is stored in the controller cache memory 116. The credits are numerical values that indicate how many pages of data that have been stored in a memory including random access memory (RAM), wherein the pages of the data are to be eventually stored in a non-volatile memory.

The controller scram memory 122 can be integrated in the storage channel controller 112 or external to the storage channel controller 112. The controller scram memory 122 can include any memory devices including volatile and nonvolatile memory devices. For example, the controller scram memory 122 can include 256 KB or any other storage capacities.

Each of the storage device systems 106 includes any number of channels 130, which is a communication bus for a storage controller to interface with storage devices. Each of the channels 130 is connected to a number of the non-volatile memory devices 114. For example, each of the channels 130 can be a NAND bus or any other communication busses interfacing with storage devices. Also for example, there can be 8 or any number of the channels 130.

For example, there can be 32 KB of the scram data 124 in the process of being transferred from the controller scram memory 122 to one of the non-volatile memory devices 114 in one of the channels 130. Also for example, there can typically be 200 micro-seconds (us) for an amount of time it takes a memory controller including a FLASH controller or the storage channel controller 112 to transfer data over a data transfer bus or the channels 130. After this transfer is completed, the non-volatile memory devices 114 including flash devices are then executing commands to start its program cycle, and at which point the data transfer bus is free again.

Further, for example, each of the non-volatile memory devices 114 can include 1800 microseconds (us) for program time. Yet further, for example, one of the non-volatile memory devices 114 in one of the channels 130 can be overlapped or operated in parallel with one of the non-volatile memory devices 114 in another of the channels 130 so that the non-volatile memory devices 114 are accessed at the same time providing high bandwidth and reduced programming time.

The concept of the embodiments described herein can be constructed and used in a solid state drive (SSD) under development. This concept can also be retrofitted into almost any SSD product with a design that requires data hardening of cached write data or the host data 110 held or stored in the adapter cache memory 108 by the host bus adapter 104 including a third party host adaptor or a data aggregator.

The embodiments described herein allow some components in the storage system 100 to notify a data sender that a write operation is complete even though those components do not implement an emergency power supply. The data sender is a component that sends the host data 110 to be eventually stored in the non-volatile memory devices 114. This allows the storage system 100 to provide improved performance while minimizing the additional cost for emergency power supplies.

For example, the components can include the host bus adapter 104, the storage channel controller 112, or a combination thereof. Also for example, the data sender can include the host system 102, the host bus adapter 104, or a combination thereof.

The embodiments described herein off-load the host system 102 from performing any amount of data hardening when there is a power interruption. This also increases performance and provides low or reduced latency of an aggregate storage device including the storage device systems 106 by providing security of the cache data 117, which the host system 102 has been informed of as saved data.

The embodiments described herein include a hardware and firmware protocol for performing data hardening on a RAID aggregate storage device or the storage device systems 106 typically found in a dual in-line memory module (DIMM) form factor. Components in the storage device systems 106 that include the non-volatile memory devices 114 provide an interface to other components of the storage device systems 106, wherein the interface allows the other components to send write data or the host data 110 that must be saved when loss of power is detected.

The interface provides a number of capabilities for data sender components or the data sender and the other components previously described to send the host data 110. One of the capabilities is for the data sender to query a non-volatile storage component for an amount of the host data 110 that can be saved. For example, the non-volatile storage component includes one of the storage device systems 106 or the storage channel controller 112 in one of the storage device systems 106.

Another of the capabilities is for the data sender to send the host data 110 to the non-volatile storage component, wherein the host data 110 can be saved outside a normal or predetermined address range of the data sender. Another of the capabilities is for the data sender to notify the non-volatile storage component when there is no more data or none of the host data 110 to be saved or eventually stored in the non-volatile memory devices 114 by the storage channel controller 112.

Another of the capabilities is for the data sender to query the non-volatile storage component for information about the host data 110 that was previously saved. Another of the capabilities is for the data sender to request previously saved data to be returned from the non-volatile storage component.

A process of data hardening an aggregated DIMM type storage device includes a set of distinctive components or operations. The process of the data hardening refers to a process of transferring and storing the host data 110, which is eventually going to be stored to the non-volatile memory devices 114. The distinctive components include signaling and control for the host bus adapter 104 to connect to the storage device systems 106.

The distinctive components also include an overlap of non-volatile memory operations to allow additional parity protection to be supplied. For example, the non-volatile memory operations can be NAND or NVSTORE operations. The distinctive components also include an overlap of the non-volatile memory operations to minimize an amount of time to store the host data 110 and meta-data 132 from the host bus adapter 104, the storage channel controller 112, or a combination thereof.

The meta-data 132 includes non-host related information that is in addition to and stored along with the host data 110 for control or management of the non-volatile memory devices 114. The term "meta-data" is defined as non-host related information that is in addition to and stored along with host data and that aids or supports retrieval, organization, health of, and current condition or state of memory devices.

When a power failure event happens, the host bus adapter 104 or a host RAID controller and each of the SSDs, storage units, or the storage device systems 106 can be signaled at the same time. The term "power failure" (PFAIL) referred to herein is defined as a hardware or software event that signals a power interruption has occurred requiring storage devices to perform a data hardening event.

There are also firmware variations of this process whereby the host system 102 can trigger one of these events without a physical power failure. For example, the host system 102 can generate and send a request to the host bus adapter 104, which interfaces with the storage channel controller 112 to send the host data 110 to be stored to the non-volatile memory devices 114 without the power failure event or the physical power failure.

Following the power failure (PFAIL) event, the host bus adapter 104 or the host RAID controller can use out-of-band signaling to send its cache data to the storage units or the storage device systems 106 via the storage channel controller 112. Upon completion of the transmission of all of the host data 110 to be saved from the host bus adapter 104, a completion signal 134 can be transmitted by the host bus adapter 104 to each of the storage devices or the storage device systems 106. The completion signal 134 indicates that the cache data 117 from the host bus adapter 104 has been sent to the storage channel controller 112 to be stored in the non-volatile memory devices 114.

There are safeguards in place for incorrect signaling and for problems, whereby the host bus adapter 104 cannot transmit all of the host data 110 in its cache or the adapter cache memory 108 alone with information related to the meta-data 132 in a timely fashion. The safeguards can be in the form of command timeouts.

If a time from the start of a cache save command is not met by the end of the cache save command, data received can be saved and a log entry can be made indicating an incomplete cache store. There can be checkpoint commands sent in a cache data stream indicating what percentage of cache data has been sent for saving. If not all of the cache data (i.e., less than 100%) is sent, a log entry can be made as to the incomplete cache store or save.

The cache data sent can also include a list of host logical block addresses (LBAs) included in the cache data and a number of logical blocks of cache to scram.

The cache data 117 and the meta-data 132 from the host bus adapter 104 can be divided and sent to a number of attached storage devices or the storage device systems 106 for distribution of HBA data. For example, the number of the storage device systems 106 can be from one to all of the storage device systems 106.

The host bus adapter 104 between the host system and SSDs or the storage device systems 106 does not have non-volatile storage or non-volatile memories. Thus, it is important to back up the host data 110 stored in the adapter cache memory 108 by the host bus adapter 104. When the host data 110 has been stored by the host bus adapter 104, the host system 102 is notified by the host bus adapter 104 that the host data 110 has just been saved or stored, although the host data 110 has not been saved or stored in the non-volatile memory devices 114 yet.

The host data 110 that has just been stored in the adapter cache memory 108 is eventually stored in the non-volatile memory devices 114 using the data hardening. When the storage system 100 is powered up, the host data 110 is retrieved or read from the non-volatile memory devices 114 and written to the adapter cache memory 108 as though power had not been taken away.

Figure 2:
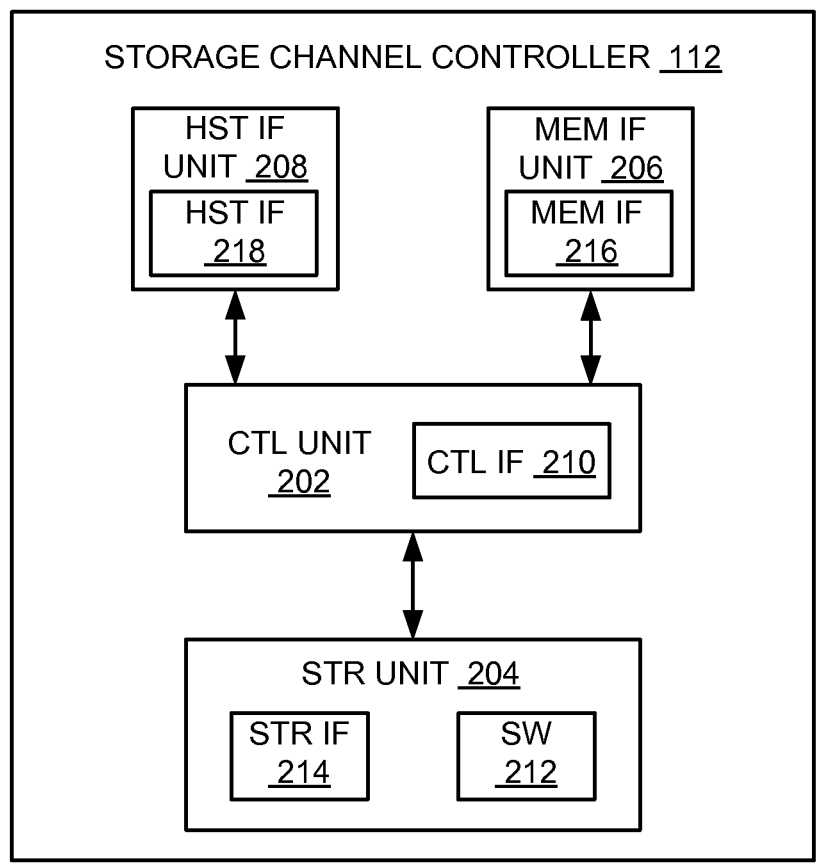
FIG. 2 is an exemplary hardware block diagram of the storage channel controller.

Referring now to FIG. 2, therein is shown an exemplary hardware block diagram of the storage channel controller 112. There can be a plurality of storage channel controllers in the storage system 100 of FIG. 1 with multiple storage devices or the non-volatile memory devices 114 of FIG. 1.

The storage channel controller 112 can include a control unit 202, a storage unit 204, a memory interface unit 206, and a host interface unit 208. The control unit 202 can include a control interface 210. The control unit 202 can execute a software 212 stored in the storage unit 204 to provide the intelligence of the storage channel controller 112.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the storage channel controller 112. The control interface 210 can also be used for communication that is external to the storage channel controller 112.

The control interface 210 can receive information from the other functional units or from external sources, or can transmit information to the other functional units or to external destinations. The external sources and the external destinations refer to sources and destinations external to the storage channel controller 112.

The control interface 210 can be implemented in different ways and can include different implementations depending on which functional units or external units are being interfaced with the control interface 210. For example, the control interface 210 can be implemented with a dedicated hardware including an application-specific integrated circuit (ASIC), a configurable hardware including a field-programmable gate array (FPGA), a discrete electronic hardware, or a combination thereof.

The storage unit 204 can include both hardware and the software 212. For example, the software 212 can include control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the storage channel controller 112. The storage interface 214 can receive information from the other functional units or from external sources, or can transmit information to the other functional units or to external destinations. The external sources and the external destinations refer to sources and destinations external to the storage channel controller 112.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the storage channel controller 112. For example, the memory interface unit 206 can permit the storage channel controller 112 to communicate with the non-volatile memory devices of FIG. 1.

The memory interface unit 206 can include a memory interface 216. The memory interface 216 can be used for communication between the memory interface unit 206 and other functional units in the storage channel controller 112. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 102 of FIG. 1 to interface and interact with the storage channel controller 112. The host interface unit 208 can include a host interface 218 to provide communication mechanism between the host interface unit 208 and the host system 102.

The control unit 202 can operate the host interface unit 208 to send control or status information generated by the storage channel controller 112 to the host system 102. The control unit 202 can also execute the software 212 for the other functions of the storage channel controller 112. The control unit 202 can further execute the software 212 for interaction with the non-volatile memory devices via the memory interface unit 206.

The functional units in the storage channel controller 112 can work individually and independently of the other functional units. For illustrative purposes, the storage channel controller 112 is described by operation of the storage channel controller 112 with the host system 102 and the non-volatile memory devices. It is understood that the storage channel controller 112, the host system 102, and the non-volatile memory devices can operate any of the modules and functions of the storage channel controller 112.

The term "module" referred to herein can include software, hardware, or a combination thereof in the present disclosure in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Figure 3:
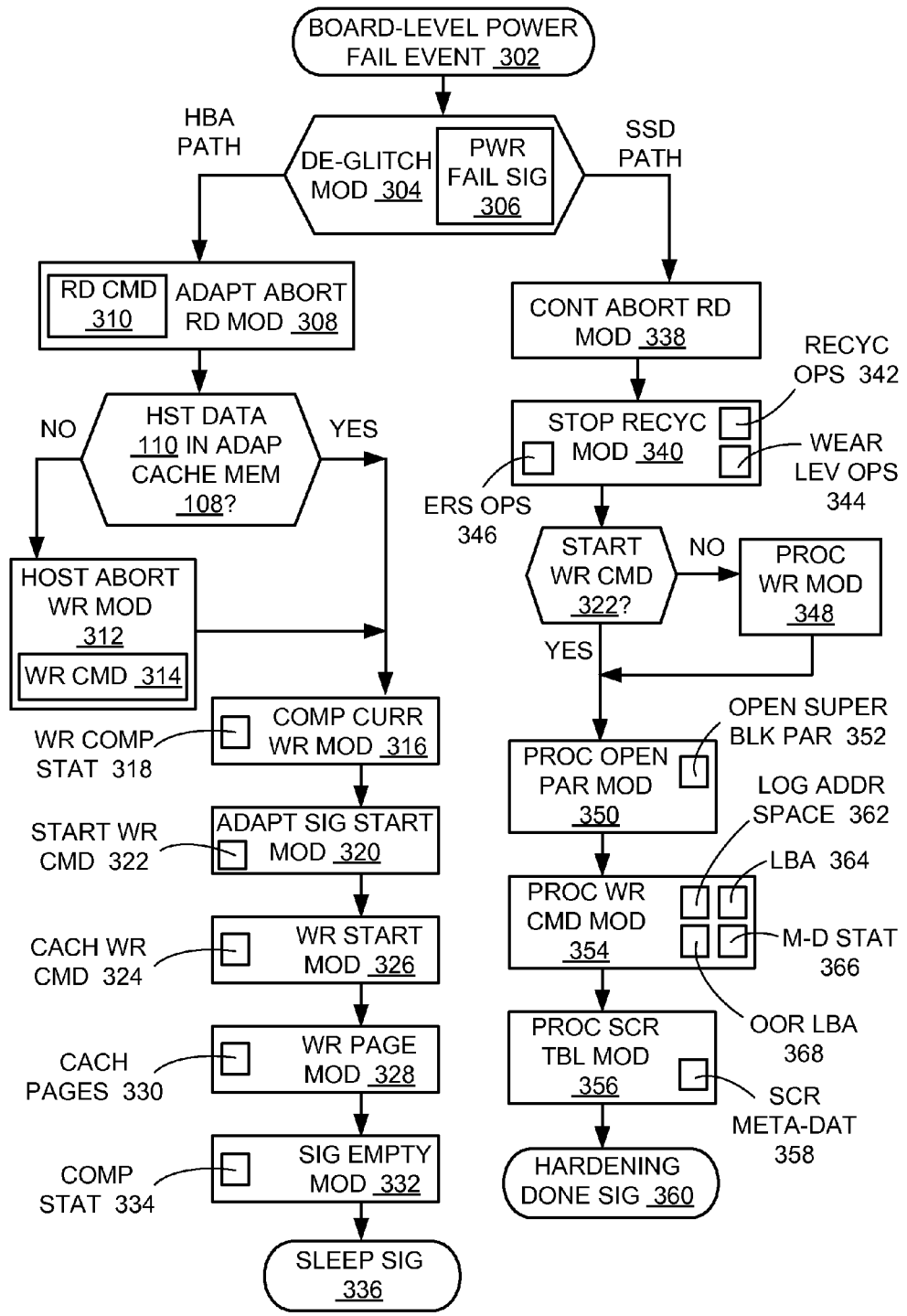
FIG. 3 is an exemplary control flow for a data hardening event.

Referring now to FIG. 3, therein is shown an exemplary control flow for a data hardening event. FIG. 3 depicts detection of a board-level power failure event 302, which indicates that electrical power is going to be no longer available in the storage system 100 of FIG. 1.

After the board-level power failure event 302 is detected, a de-glitch module 304 generates and sends a power failure signal 306 to the host bus adapter 104 of FIG. 1 and the storage device systems 106 of FIG. 1. For example, the host bus adapter 104 can include a RAID controller or a data aggregator. The term "de-glitch" referred to herein refers to a mechanism of filtering out a narrow power spike or a signal having a pulse width less than a predetermined time and generating a signal indicating that there is truly a power failure.

For illustrative purposes, the de-glitch module 304 is shown with a box that appears to be a decision box, although it is understood that the box, instead, is used to indicate that there is a division of labor between the host bus adapter 104 and the storage device systems 106. Once the de-glitch mechanism is complete, the power failure signal 306 is sent to the host bus adapter 104 and the storage device systems 106 at once. The SSDs or the storage device systems 106 can start preparing and operating in the background before the host bus adapter 104 is ready to start sending its cache data, or the host data 110 stored in the adapter cache memory 108, over to the storage device systems 106.

FIG. 3 depicts operations performed by the host bus adapter 104 on the left side of the de-glitch module 304, labeled as "HBA path". FIG. 3 also depicts operations performed by the storage device systems 106 on the right side of the de-glitch module 304, labeled as a "SSD path".

In the HBA path, an adapter abort read module 308 receives the power failure signal 306 from the de-glitch module 304. Any read commands 310 that are in process and performed by the host bus adapter 104 for the host system 102 of FIG. 1 can be aborted or stopped by the adapter abort read module 308. Since the electrical power is going to be no longer available, the read commands 310 performed for the host system 102 can be aborted since data from the read commands 310 is not going to be processed by the host system 102. This allows computing and storage resources to be freed up for operations associated with the data hardening.

After the adapter abort read module 308 aborts the read commands 310, a host abort write module 312 aborts or stops any number of write commands 314 that are currently in process and the host data 110 for the write commands 314 not held completely in the adapter cache memory 108. The write commands 314 are operations performed by the host bus adapter 104 in response to requests from the host system 102 for writing the host data 110 to the non-volatile memory devices 114 of FIG. 1. The host abort write module 312 also performs any clean-up necessary for table or information associated with the write commands 314 aborted by the host abort write module 312.

For example, the host system 102 generates and sends a write request to the host bus adapter 104 to perform one of the write commands 314 to write the host data 110 to 100 logical block addresses (LBAs) or logical blocks. Only half of the 100 logical blocks have been written by writing the host data 110 to the adapter cache memory 108. Then, the host abort write module 312 can abort the one of the write commands 314 since a data transfer for all of the 100 logical blocks is not complete.

If there is one of the write commands 314 that are currently being transferred between the host bus adapter 104 and the storage device systems 106 while the host data 110 is held completely in the adapter cache memory 108 for another of the write commands 314, a complete current write module 316 performs the one of the write commands 314. The complete current write module 316 performs the one of the write commands 314 by completely transferring the host data 110 from the host bus adapter 104 to the storage device systems 106, including SSD-A and SSD-B. After the complete current write module 316 performs the one of the write commands 314, the complete current write module 316 generates and sends a write complete status 318 to the host system 102 for indicating that the one of the write commands 314 is completed.

An adapter signal start module 320 also receives the write complete status 318. After the adapter signal start module 320 receives the write complete status 318, the adapter signal start module 320 generates and sends a start write command 322 to the storage device systems 106 to start execution of a cache write command 324 to be executed by a write start module 326. The cache write command 324 is information used to control transfer of the cache data 117 of FIG. 1 from the adapter cache memory 108 to the controller scram memory 122 of FIG. 1.

The adapter signal start module 320 sends the start write command 322 to the storage device systems 106 to indicate that the adapter signal start module 320 wants to start writing its cache data. The cache data can be the host data 110 stored in the adapter cache memory 108 from the host bus adapter 104 to any number of the SSDs or the storage device systems 106. For example, the complete current write module 316 can send the start write command 322 to one or two of the storage device systems 106.

After the adapter signal start module 320 signals the storage device systems 106 of the start of the cache write command 324, the write start module 326 starts the host bus adapter 104 to perform the execution of the cache write command 324. After the host bus adapter 104 is started, the execution of the cache write command 324 is performed by a write page module 328. The execution of the cache write command 324 is performed by sending cache pages 330 of the cache data 117 from the adapter cache memory 108 to the storage channel controller 112 of FIG. 1 to store the cache pages 330 in the controller scram memory 122 in each of the storage device systems 106 including SSD-A and SSD-B.

The host bus adapter 104 is capable of writing to any number or all of the storage device systems 106 in parallel to save time resulting in improved performance. All pages of the cache data 117 stored in the adapter cache memory 108 are sent to and stored by the storage channel controller 112 in each of the storage device systems 106.

After the execution of the cache write command 324 is completely performed, a signal empty module 332 generates and sends a complete status 334 to signal the storage channel controller 112 in the storage device systems 106 that the adapter cache memory 108 of the host bus adapter 104 is empty. The signal empty module 332 generates and sends a sleep signal 336 to the host bus adapter 104 to indicate that the cache write command 324 is complete so that the host bus adapter 104 can be shut down or powered down to save power. The storage device systems 106 is not shut down at this time, but the host bus adapter 104 has been completely flushed out or emptied and thus can be shut down without impacting the remaining portion of the data hardening.

In the SSD path, a controller abort read module 338 interrupts the storage device systems 106 so that the storage device systems 106 aborts the read commands 310 after the controller abort read module 338 receives the power failure signal 306 from the de-glitch module 304. Upon receiving the power failure signal 306, the controller abort read module 338 can abort the read commands 310 since the host data 110 read from the non-volatile memory devices 114 for the host system 102 is no longer important or needed.

The power failure signal 306 indicates that the electrical power is going to be no longer available in the storage system 100. The read commands 310 are information used to control transfer of the host data 110 from the non-volatile memory devices 114 by the storage channel controller 112 to the host bus adapter 104, which in turn sends the host data 110 back to the host system 102.

After the read commands 310 are aborted, a stop recycle module 340 stops recycle operations 342. The stop recycle module 340 also aborts any wear leveling operations 344 that are going on in the storage device systems 106. The stop recycle module 340 also aborts erase operations 346 or any other operations that are not critical to be performed in response to the detection of the power failure signal 306.

The recycle operations 342 are processes of moving data from one page to another page for purposes of either freeing up erase blocks to write new host data or to ensure that data on an erase block is preserved. The wear leveling operations 344 are processes of recycling erase blocks for purposes of erasing or writing evenly among the erase blocks in a memory device. The term "erase block" referred to herein is defined as a group of pages, which is the smallest number of pages that are erased at one time.

The erase operations 346 are processes that change contents of a storage element of a memory device. For example, the erase operations 346 can include a process that erases a NAND flash cell by removing the negative charge in the floating gate, resulting in a "1" bit value for that cell.

After the stop recycle module 340 is completed, a process write module 348 processes the one of the write commands 314 that the complete current write module 316 performs for the host data 110 if there is no start of cache dump traffic. The process write module 348 determines that there is no start of cache dump traffic by detecting for the start write command 322. If the start write command 322 is not received from the adapter signal start module 320, there is no start of cache dump traffic. The process write module 348 performs normal processing of incoming write commands from the host system 102.

When the electrical power is interrupted, the storage system 100 can actually be in the middle of a write operation from the host system 102. In this case, the process write module 348 performs the normal processing of the incoming write commands with the host bus adapter 104 sending the host data 110 to the storage device systems 106. By the time the storage device systems 106 completely processes the incoming write commands, there can be additional cache data in the adapter cache memory 108. This is a logical division between normally written data and then special cache data or the cache data 117.

When the additional cache data is in the adapter cache memory 108, the start of cache dump traffic occurs by the adapter signal start module 320 sending the start write command 322 to the storage device systems 106. In FIG. 3, the decision box that determines whether the start write command 322 is received is tied together in time with the box for the adapter signal start module 320.

After a process open parity module 350 receives the start write command 322 from the adapter signal start module 320, the process open parity module 350 processes all open super block parities 352, which are information used for error detection of super blocks. The term "super block" referred to herein is defined as a logical grouping of erase blocks in non-volatile memory devices.

The super blocks are logical groupings of erase blocks in non-volatile memories. The process open parity module 350 processes the open super block parities 352 to do a cleanup in preparation for the cache write command 324 for the special cache data to be saved as previously mentioned.

The open super block parities 352 are generated for open super blocks from normal host writes that are not for the special cache data. The term "open" refers to super blocks that are available for storing data or those that are not completely written with data. After the open super blocks are written with the host data 110, the super blocks are closed and the open super block parities 352 are generated for these super blocks so that all the data in the currently executing path for writes is secure.

After the open super block parities 352 are generated, a process write command module 354 processes the cache write command 324 from the host bus adapter 104 and write the cache pages 330 of the cache data 117 stored in the adapter cache memory 108 out to the non-volatile memory devices 114. The process write command module 354 receives the cache pages 330 from the write page module 328 and store the cache pages 330 in the controller scram memory 122 in each of the storage device systems 106. The process write command module 354 then subsequently write the cache pages 330 in the controller scram memory 122 to the non-volatile memory devices 114.

After the PWCM is completed, a process scram table module 356 saves scram meta-data 358 in the non-volatile memory devices 114. The scram meta-data 358 is information used for control and management of the host data 110 stored in the controller scram memory 122 in the data hardening.

After the process scram table module 356 is completed, the process scram table module 356 generates and sends a hardening done signal 360 to indicate that the data hardening process is completed. Upon receiving the hardening done signal 360, power supply components in the storage system 100 can turn off power supplies provided to the storage device systems 106.

The storage system 100 can include a bus interface that connects the host bus adapter 104 to mass storage devices or the storage device systems 106. For example, the bus interface includes a Serial AT Attachment (SATA) protocol interface, which is described below.

In the path labeled "HBA path" of FIG. 3, a current host write to the storage channel controller 112 including a flash controller can be completed after it has been determined that the current host write is held completely in a cache memory or the adapter cache memory 108. The current host write can be the one of the write commands 314 as described above for the complete current write module 316.

The meta-data 132 of FIG. 1 of a memory module including a flash memory module (FD) is accessed using read and write commands with a logical block addressing (LBA) range. The LBA range is above a logical address space 362 of the storage device systems 106. The logical address space 362 includes addresses that are allocated for the storage device systems 106 for storing or retrieving data during normal operations that are not for purposes of data hardening.

For example, the logical block addressing (LBA) range includes 0x8000.0000.0000 through 0x8000.0000.01FF, where "0x" indicates that values are in hexadecimal. Any LBA range that is outside the logical address range or range of the SSDs (drives) can function for this. All the addresses in the embodiments described herein are examples. The addresses in real use are to be agreed upon by all parties or devices that interface with each other. A flash memory module includes an interface to a host system. For example, the flash memory module can be a flash dual in-line memory module (DIMM).

In the case mentioned above, the range of LBAs is well out of the normal address space of the storage device, the SSD, or the storage device systems 106. The firmware executing in the SSD can be able to recognize that this is a special command by examining the address range for the command. Additionally, since these commands are associated with the "store and retrieve" of special data or the host data 110 stored in the adapter cache memory 108 during the data hardening process, they are only allowed to be executed at specific times during the operation of the drive.

Meta-data read commands are executed any time the drive is ready and is not executing the power fail sequence. Meta-data write commands are executed only when the drive or the storage device systems 106 are executing the power fail sequence. The first Meta-Data Write to the drive during the power fail sequence resets the count of valid meta-data sectors with the count of data sectors for this command.

Subsequent Meta-Data Write commands can use a logical block address 364 (LBA) that is contiguous to the previous write command and the valid meta-data sector count will be incremented by the sector count of the current command. Outside the read and write commands, there are a set of control and signaling commands.

In addition, the store and retrieve commands can be used at the completion of a PFAIL event. For example, the FD Meta-Data Complete command is a data write command with the LBA set to 0x8000.0000.0200. The Meta-Data Complete command signals to the drive that the Meta-Data Writes are complete. The Meta-Data Complete command is superfluous if the prior command is a Meta-Data Write command that includes LBA 0x8000.0000.01FF.

If none of the meta-data 132 is written during the power-fail sequence and the drive receives the Meta-Data Complete command, then the meta-data 132 that was recovered during the previous de-scram is re-written to the non-volatile memory devices 114 including the flash media and can be re-recovered during the next de-scram. De-scram is a procedure used after a storage system is powered back up to restore data from non-volatile memories to volatile memories used as cache memories back to a state of the volatile memories before the storage system was previously powered down.

For example, the FD Meta-Data Status command is a data read command with the LBA set to 0xC000.0000.0000. This command returns one sector of data that includes a meta-data status 366 and the most recent temperature sample. Also for example, the drive format sequence includes initializing the FD meta-data memory to contain 256 sectors of zero-initialized data. The meta-data valid sector count and all flags are set to zero. The term "drive format" referred to herein is defined as a process that invalidates all customer data on a drive and zeros meta-data.

The storage system 100 includes a number of sequences, as described below, to be performed related to detection of the board-level power failure event 302. One of the sequences is a drive power fail sequence. A drive or the storage device systems 106 enters the drive power fail sequence when a power failure or the board-level power failure event 302 is detected, a Meta-Data Write command is received, or a Meta-Data Complete command is received.

A timer is started when the power failure is detected. This timer is started independent of which event that caused entry into the drive power fail sequence. This timer is used to enforce time limits in order complete a scram process for the data hardening.

Another of the sequences is a power fail detected sequence. In the power fail detected sequence, the drive performs the following sequence when the power failure is detected.

1. If there are any active commands, then stop transfer state machines including those with SATA interfaces. If there is still an active command, then terminate the command with a command-abort error. This can cause all active commands and all commands pending execution in the hardware to be terminated. For example, if the terminated commands are Native Command Queuing (NCQ) commands, then the host bus adapter 104 can send a Read Log Extended for the NCQ Error Log in order to clear the error state in the drive or the storage device systems 106.

2. Wait for a Meta-Data Write command or a Meta-Data Complete command from the host system 102. If a command received from the host system 102 is neither the Meta-Data Write command nor the Meta-Data Complete command, then terminate the command with a command-abort. If the terminated command is an NCQ command, then the host bus adapter 104 can send a Read Log Extended for the NCQ Error Log in order to clear the error state in the drive or the storage device systems 106.

3. Continue with a Power Fail Common Sequence, which will subsequently be described below.

Native Command Queuing (NCQ) is a mechanism that allows a drive to internally optimize an order in which received read and write commands are executed. This reduces an amount of unnecessary operations including drive head movement, resulting in increased performance and slightly decreased wear of the drive for workloads where multiple simultaneous read/write requests are outstanding, most often occurring in server-type applications.

Although Native Command Queuing (NCQ) is described in the embodiments described herein, it is understood that any mechanisms associated with optimization for execution order of received read and write commands can be used. For example, the embodiments described herein reference to SATA commands and NCQ for SATA drives but are not limited to SATA, and so the same thing can be done in Serial Attached SCSI (SAS), Peripheral Component Interconnect Express (PCIe), and any other protocols.

Another of the sequences is a Meta-Data Write or Meta-Data Complete Command Received Sequence. In the Meta-Data Write or Meta-Data Complete Command Received Sequence, the drive or the storage device systems 106 performs the following sequence when either the Meta-Data Write command or the Meta-Data Complete command is received.

1. Wait for power failure detection or detection of the board-level power failure event 302. If the power failure is not detected within a predetermined time, then terminate the command with the command-abort. For example, the predetermined time can be from microseconds (us) to milliseconds (ms). As a specific example, the predetermined time can be from 10 s of microseconds to 10 s of milliseconds. Also for example, if the terminated command is an NCQ command, then the host bus adapter 104 can send a Read Log Extended for the NCQ Error Log in order to clear the error state in the drive.

2. Continue with the Power Fail Common Sequence, which will subsequently be described below.

Another of the sequences is the Power Fail Common Sequence. The Power Fail Common Sequence is described as follows.

1. If either the Meta-Data Write command or the Meta-Data Complete command has not been received, then wait for one of these commands. If a command is received that is neither the Meta-Data Write command or the Meta-Data Complete command, then terminate the command with the command-abort. If the terminated command is an NCQ command, then the host bus adapter 104 can send a Read Log Extended for the NCQ Error Log in order to clear the error state in the drive.

2. If the Meta-Data Write command is received, then validate the command by checking for adjacent LBA range, and for example, the LBA range is between 0x8000.0000.0000 and 0x8000.0000.01FF, and the first write starts with LBA 0x8000.0000.0000. If validation fails, then terminate the command with the command abort. If this is the first write command, then invalidate the current meta-data stored in data memory. Continue to look for another Meta-Data Write command or the Meta-Data Complete command.

3. If a Meta-Data Complete command is received, then mark meta-data complete and wait for scram complete.

4. Throughout the entire power fail sequence, the power fail timer is monitored to enforce timeout requirements. The FD meta-data can be valid in drive memory at a predetermined number of microseconds into the power fail sequence. If the meta-data 132 is not valid by this time, then any active command is terminated with command-abort. The meta-data status 366 is updated to indicate the timeout occurred. The meta-data 132 and the meta-data status 366 are now written to the flash media.

As an example, throughout the entire power fail sequence, the power fail timer is monitored to enforce the predetermined number on an order of less than 10 milliseconds. As a specific example, the power fail timer is monitored to enforce the predetermined number on an order of between 100 microseconds and 5 milliseconds.

A tagging mechanism is used in the Power Fail Common Sequence and the bus interface described above where the special cache data in each of the SSDs or the storage device systems 106 is identified by using out-of-range logical block addresses 368. The out-of-range logical block addresses 368 are address space that is not used for writing the host data 110 during normal operation, which is performed when the power failure signal 306 is not generated.

The out-of-range logical block addresses 368 are used only to write the cache data 117 and the meta-data 132 for the data hardening. The out-of-range logical block addresses 368 are above the logical address space 362 of the storage device systems 106. The tagging mechanism allows identification of the special cache data using the out-of-range logical block addresses 368 without additional hardware resources. The out-of-range logical block addresses 368 are used by the write page module 328 for writing the cache pages 330.

The out-of-range logical block addresses 368 are predetermined ranges of addresses that are not used by the normal processing of incoming write commands from the host system 102 as previously described. The out-of-range logical block addresses 368 are used for executing the write commands 314 after the start write command 322 is generated. The start write command 322 is generated for the process write command module 354 to process the cache write command 324 from the host bus adapter 104 and write the host data 110 stored in the adapter cache memory 108 out to the non-volatile memory devices 114.

Another of the sequences is a Drive Power-On Sequence, which is described as follows. The Drive Power-On Sequence is used when the electrical power comes back on to replace the adapter cache memory 108 with the host data 110 back to where the adapter cache memory 108 was as though the electrical power never went off.

The host bus adapter 104 interfaces with the storage channel controller 112 to write the cache pages 330 with the cache data 117 back to the adapter cache memory 108 upon powering up the host bus adapter 104 and the storage channel controller 112 when the electrical power comes back up after the power failure signal 306 is detected. This aspect of the invention provides improved reliability, availability, and serviceability to the host system 102.

In the Drive Power-On Sequence, a drive status of the drive or the storage device systems 106 is busy at power on. The drive recovers the FD meta-data or the meta-data 132 into memory or the adapter cache memory 108 as part of a descram process. The drive changes the drive status to ready. The drive can now process Meta-Data Read and Meta-Data Status commands. The memory module (FD) can use these commands to restore its meta-data.

If another power fail occurs prior to meta-data restoration, then the FD can handle the new power fail by either issuing a Meta-Data Complete command or by doing nothing. In either case, the same meta-data and the meta-data status 366 that were recovered in the previous de-scram can be saved to the non-volatile memory devices 114 including flash media.

The meta-data status 366 includes a version number, a number of meta-data-write sectors, a number of meta-data-read sectors, flags, a history of previous meta-data statuses, and temperature. The version number, the number of the meta-data-write sectors, the number of the meta-data-read sectors, the flags, the history of the previous meta-data statuses, and the temperature can include any number of bytes. The history can include any number of the previous meta-data statuses. For example, the history can include 15 of the previous meta-data statuses.

For example, the version number, the number of the meta-data-write sectors, the number of the meta-data-read sectors, the flags, the history of the previous meta-data statuses, and the temperature can include consecutive bytes 0-1, 2-3, 4-5, 6-7, 8-97, and 98, respectively, of the meta-data status 366. Also for example, the flags can include Meta-Data-Complete command received, Meta-Data-Write first LBA not offset zero error, Meta-Data-Write non-contiguous LBA error, Meta-Data-Write LBA range error, Meta-Data-Write LBA range complete, Meta-Data save timeout occurred, and Meta-Data-Status command received.

The host system 102 can decide ahead of time that it receives an indication from line power that the electrical power is going to be failing soon and initiates a soft data hardening process. While the electrical power has not been completely lost, the host system 102 decides to perform the soft data hardening process since the electrical power is going to be lost.

When the electrical power is not lost, the soft data hardening process can also be used for a number of purposes. For example, one of the purposes is that the soft data hardening process can be used for debug. Also for example, the soft data hardening process can be used for a checkpoint for operating software of the host system 102.

The soft data hardening process can be initiated by the host system 102 or the host bus adapter 104 that sets a hardware register to indicate that there is a power failure even though the electrical power is not down. This causes the de-glitch module 304 to start.

FIG. 3 can be implemented using modules. Functions or operations in the modules as described above can be implemented in hardware, software, or a combination thereof. The modules can be implemented with the control unit 202 of FIG. 2, the storage unit 204 of FIG. 2, the memory interface unit 206 of FIG. 2, the host interface unit 208 of FIG. 2, or a combination thereof.

For example, the de-glitch module 304 can be implemented with the control unit 202, the storage unit 204, the memory interface unit 206, and the host interface unit 208 for generating the power failure signal 306. Also for example, the adapter abort read module 308 can be implemented with the control unit 202, the storage unit 204, the memory interface unit 206, and the host interface unit 208 for receiving the power failure signal 306 and aborting the read commands 310.

For example, the host abort write module 312 can be implemented with the control unit 202, the storage unit 204, the memory interface unit 206, and the host interface unit 208 for aborting the write commands 314. Also for example, the complete current write module 316 can be implemented with the control unit 202, the storage unit 204, the memory interface unit 206, and the host interface unit 208 for performing the one of the write commands 314.

For example, the adapter signal start module 320 can be implemented with the control unit 202, the storage unit 204, the memory interface unit 206, and the host interface unit 208 for generating and sending the start write command 322 to the storage device systems 106. Also for example, the write start module 326 can be implemented with the control unit 202, the storage unit 204, the memory interface unit 206, and the host interface unit 208 for executing the cache write command 324.

For example, the write page module 328 can be implemented with the control unit 202, the storage unit 204, the memory interface unit 206, and the host interface unit 208 for performing the execution of the cache write command 324. Also for example, the signal empty module 332 can be implemented with the control unit 202, the storage unit 204, the memory interface unit 206, and the host interface unit 208 for generating the sleep signal 336.

For example, the controller abort read module 338 can be implemented with the control unit 202, the storage unit 204, the memory interface unit 206, and the host interface unit 208 for aborting the read commands 310 upon receiving the power failure signal 306. Also for example, the stop recycle module 340 can be implemented with the control unit 202, the storage unit 204, the memory interface unit 206, and the host interface unit 208 for aborting the wear leveling operations 344.

For example, the process write module 348 can be implemented with the control unit 202, the storage unit 204, the memory interface unit 206, and the host interface unit 208 for processing the one of the write commands 314 that the complete current write module 316 performs for the host data 110. Also for example, the process open parity module 350 can be implemented with the control unit 202, the storage unit 204, the memory interface unit 206, and the host interface unit 208 for processing all the open super block parities 352.

For example, the process write command module 354 can be implemented with the control unit 202, the storage unit 204, the memory interface unit 206, and the host interface unit 208 for processing the cache write command 324 from the host bus adapter 104. Also for example, the process scram table module 356 can be implemented with the control unit 202, the storage unit 204, the memory interface unit 206, and the host interface unit 208 for saving the scram meta-data 358 in the non-volatile memory devices 114.

The de-glitch module 304 can be coupled to the adapter abort read module 308 and the controller abort read module 338. The adapter abort read module 308 can be coupled to the host abort write module 312 and the complete current write module 316. The complete current write module 316 can be coupled to the adapter signal start module 320. The adapter signal start module 320 can be coupled to the write start module 326.

The write start module 326 can be coupled to the write page module 328. The write page module 328 can be coupled to the signal empty module 332. The controller abort read module 338 can be coupled to the stop recycle module 340. The stop recycle module 340 can be coupled to the process write module 348 and the process open parity module 350. The process open parity module 350 can be coupled to the process write command module 354. The process write command module 354 can be coupled to the process scram table module 356.

The storage system 100 is described with module functions or order as an example. The modules can be partitioned differently. Each of the modules can operate individually and independently of the other modules.

Furthermore, data generated in one module can be used by another module without being directly coupled to each other.

Yet further, the modules can be implemented as hardware accelerators (not shown) within the control unit 202 or can be implemented as hardware accelerators (not shown) in the storage channel controller 112 or outside of the storage channel controller 112.

Figure 4:
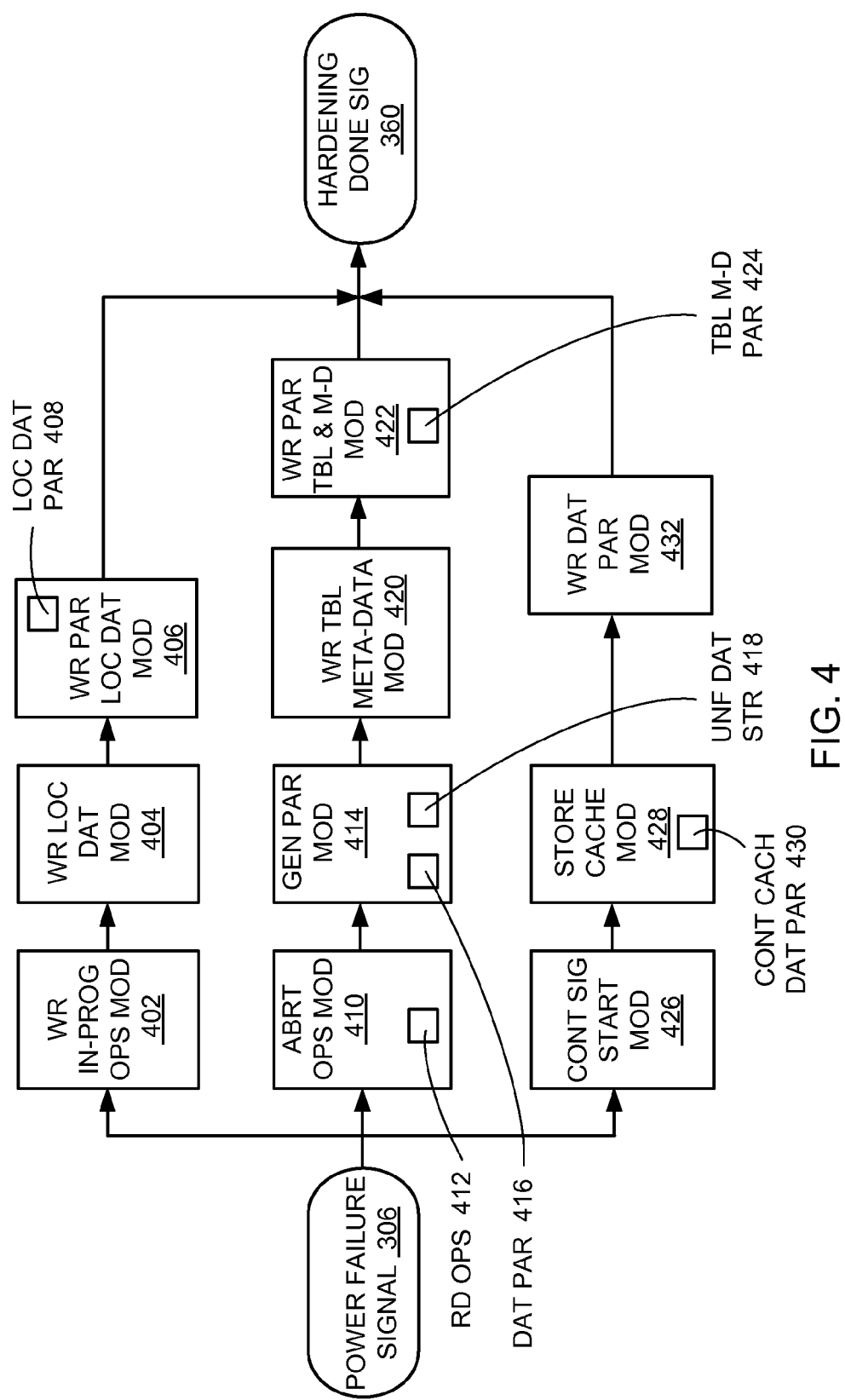
FIG. 4 is an exemplary flow for a bus interface and backend controller operations of the storage device systems.

Referring now to FIG. 4, therein is shown an exemplary flow for a bus interface and backend controller operations of the storage device systems 106 of FIG. 1. For example, FIG. 4 depicts a general flow for the bus interface including a NAND bus.

The backend of the drive or the storage device systems 106 that are in control of a memory array or the non-volatile memory devices 114 of FIG. 1 including NAND can be set up in such a way as to take maximum advantage of parallel execution of commands across an array of memory channels or the channels 130 of FIG. 1. Since there is a limited amount of the electrical power and some of the electrical power is needed for controllers and peripheral circuits, is it important to save accumulated data as fast as possible. Additionally, because there is little time to correct for a program failure, data can have parity protection written out in addition to normal ECC attached to all of the data.

The term "error correction code" (ECC) referred to herein is defined as parity data generated over a set of data grouped into a code word. The term "code word" referred to herein is defined as a group of data bytes covered by a single of multiple ECC parity words.

For example, when using Multi Level Cell (MLC) flash memories, it is important to reduce a programming time by the use of "fast pages" only when possible. Additionally, when there are multiple of the non-volatile memory devices 114 on a memory channel or the channels 130, it is important to use as many of the non-volatile memory devices 114 in parallel as can be executed given power and firmware constraints.

The term "multi level cell" (MLC) referred to herein is defined as a storage structure with multiple levels or states in a single storage element or cell. For example, an MLC includes a tri level cell (TLC). The term "fast pages" referred to herein is defined as a page with improved performance over other pages. For example, in an MLC, the first page or a least-significant-byte (LSB) page of a pair of coupled pages is programmed typically 4 to 5 times faster than the other paired slow page or a most significant (MSB) page.

FIG. 4 is a block diagram that shows some of parallel operations that are taking place in the back end of a controller section including the storage channel controller 112 of FIG. 1 of a storage device or each of the storage device systems 106. The parallel operations are also performed in parallel with operations of the host bus adapter 104 of FIG. 1 as previously described in FIG. 3.

When the power failure signal 306 is active, a write in-progress operations module 402 writes the host data 110 of FIG. 1 for the write commands 314 of FIG. 3 that are in-progress. This allows in-progress write operations to complete even when the power failure signal 306 occurs. The write in-progress operations module 402 continues to write the host data 110 until the write commands 314 is completed.

The write in-progress operations module 402 interfaces with the complete current write module 316 of FIG. 3 to perform the one of the write commands 314 that are currently being transferred between the host bus adapter 104 and the storage device systems 106 while the host data 110 is held completely in the adapter cache memory 108 of FIG. 1 for the another of the write commands 314. The write in-progress operations module 402 writes the host data 110 from the adapter cache memory 108 to the controller cache memory 116 of FIG. 1. When the write complete status 318 of FIG. 3 is received from the complete current write module 316, the write in-progress operations module 402 completes executing the one of the write commands 314.

After the write in-progress operations module 402 completely writes the host data 110 to the controller cache memory 116, a write local data module 404 writes out local storage device cache data. The local storage device cache data can be the host data 110 that the write in-progress operations module 402 has received from the complete current write module 316 and stored to the controller cache memory 116. The write local data module 404 writes the host data 110 stored in the controller cache memory 116 out to the non-volatile memory devices 114.

After the write local data module 404 completely writes the host data 110 stored in the controller cache memory 116 out to the non-volatile memory devices 114, a write parity local data module 406 writes out a local data parity 408. The local data parity 408 is for the local storage device cache data or the host data 110 that has been stored in the controller cache memory 116 and written out to the non-volatile memory devices 114. For example, the local data parity 408 can include RAID parity.

In parallel with the write in-progress operations module 402, an abort operations module 410 aborts the erase operations 346 of FIG. 3, read operations 412, and the recycle operations 342 of FIG. 3 when the power failure signal 306 is active. The read operations 412 are processes that are used to perform the read commands 310 of FIG. 3 in response to the host system 102 of FIG. 1 by reading and sending the host data 110 from the non-volatile memory devices 114 to the storage channel controller 112 and then subsequently to the host bus adapter 104. The abort operations module 410 can include the controller abort read module 338 of FIG. 3 and the stop recycle module 340 of FIG. 3.

The abort operations module 410 provides a mechanism to be able to quickly abort non-important operations inside the storage device systems 106 such that time is of importance here. One of the key aspects is abort all non-important operations so that there is time to get important data saved including the cache data 117 of FIG. 1 and the meta-data 132 of FIG. 1 for the data hardening. A goal of the embodiments of the present disclosure is to make a data hardening operation as short as possible, which means the least number of capacitors is required resulting in a lower cost.

The data hardening operation is performed under a predetermined interval. The predetermined interval can be dependent on the kind of media used for the non-volatile memory devices 114, the protocol, data buses, and an amount of the host data 110 to be saved, as examples. If the host data 110 that needs to be saved is much greater, then the predetermined interval can increase.

For example, the data hardening operation can be performed under 10 milliseconds the 512K and the 192 credits. Also for example, the predetermined interval can be 20 seconds if 10's of megabytes of the host data 110 need to be saved. Further, for example, the storage system 100 of FIG. 1 having the adapter cache memory 108 with 512 KB and the controller cache memory 116 with 192 credits, the predetermined interval can be 10 milliseconds.

When the abort operations module 410 is completed, a generate parity module 414 generates a data parity 416 for unfinished data stripes 418, which are data written across multiple storage devices but incompletely written due to aborted operations so the data is not completely and evenly across the storage devices. The data parity 416 can be stored in the non-volatile memory devices 114. For example, the data parity 416 can include RAID parity.

Also for example, if the host data 110 is to be written or striped across 3 of the non-volatile memory devices 114 but only 2 of the non-volatile memory devices 114 are written, the unfinished data stripes 418 would have data written on just 2 of the non-volatile memory devices 114. In this example, the data parity 416 is calculated for the 2 of the non-volatile memory devices 114.

After the data parity 416 is completely generated for the unfinished data stripes 418, a write tabling meta-data module 420 writes out local tabling and the meta-data 132 associated with the unfinished data stripes 418. Tabling is a portion of the meta-data 132 that is associated with logical-to-physical (L2P) tables. Other tables include in process or open super block meta-data information. Outside of "tabling" is meta-data such as program/erase (PE) cycle counts, read counts, bad block counts, and other housekeeping data.

After the write tabling meta-data module 420 is completed, a write parity tabling and meta-data module 422 writes out a tabling meta-data parity 424 on tabling and the meta-data 132. For example, the tabling meta-data parity 424 can include RAID parity.

In parallel with the write in-progress operations module 402 and the abort operations module 410, a controller signal start module 426 signals the host system 102 or the host bus adapter 104 to start transmission of the cache data 117 and the meta-data 132. After signaled by the controller signal start module 426 to start transmission of the cache data 117 and the meta-data 132, the adapter signal start module 320 of FIG. 3 sends the start write command 322 of FIG. 3 to the controller signal start module 426 to start execution of the cache write command 324 of FIG. 3.

After the controller signal start module 426 receives the start write command 322 from the adapter signal start module 320, a store cache module 428 stores the cache data 117 incoming or sent from the adapter cache memory 108. The store cache module 428 also generates a controller cache data parity 430 for the cache pages 330 of FIG. 3 of the cache data 117. For example, the controller cache data parity 430 can include RAID parity. The cache data 117 and the controller cache data parity 430 can be stored in the controller scram memory 122 of FIG. 1 and then eventually stored in the non-volatile memory devices 114.

After the store cache module 428 stores the cache data 117 and the controller cache data parity 430, a write data parity module 432 writes out the cache data 117 with the controller cache data parity 430. The cache data 117 and the controller cache data parity 430 are written to the non-volatile memory devices 114. After operation is completed in any of the 3 paths depicted in FIG. 4, the hardening done signal 360 is generated as previously described.

FIG. 4 can be implemented using modules. Functions or operations in the modules as described above can be implemented in hardware, software, or a combination thereof. The modules can be implemented with the control unit 202 of FIG. 2, the storage unit 204 of FIG. 2, the memory interface unit 206 of FIG. 2, the host interface unit 208 of FIG. 2, or a combination thereof.

For example, the write in-progress operations module 402 can be implemented with the control unit 202, the storage unit 204, the memory interface unit 206, and the host interface unit 208 for writing the host data 110 for the write commands 314 that are in-progress. Also for example, the write local data module 404 can be implemented with the control unit 202, the storage unit 204, the memory interface unit 206, and the host interface unit 208 for writing out the host data 110 to the controller cache memory 116.

For example, the write parity local data module 406 can be implemented with the control unit 202, the storage unit 204, the memory interface unit 206, and the host interface unit 208 for writing out the local data parity 408 for the host data 110 that has been stored in the controller cache memory 116. Also for example, the abort operations module 410 can be implemented with the control unit 202, the storage unit 204, the memory interface unit 206, and the host interface unit 208 for aborting the erase operations 346, the read operations 412, and the recycle operations 342 when the power failure signal 306 is active.

For example, the generate parity module 414 can be implemented with the control unit 202, the storage unit 204, the memory interface unit 206, and the host interface unit 208 for generating the data parity 416 for the unfinished data stripes 418. Also for example, the write tabling meta-data module 420 can be implemented with the control unit 202, the storage unit 204, the memory interface unit 206, and the host interface unit 208 for writing out the local tabling and the meta-data 132 associated with the unfinished data stripes 418.

For example, the write parity tabling and meta-data module 422 can be implemented with the control unit 202, the storage unit 204, the memory interface unit 206, and the host interface unit 208 for writing out the tabling meta-data parity 424 on the tabling and the meta-data 132. Also for example, the controller signal start module 426 can be implemented with the control unit 202, the storage unit 204, the memory interface unit 206, and the host interface unit 208 for signaling the host system 102 or the host bus adapter 104 to start transmission of the cache data 117 and the meta-data 132.

For example, the store cache module 428 can be implemented with the control unit 202, the storage unit 204, the memory interface unit 206, and the host interface unit 208 for generating the controller cache data parity 430 for writing to the non-volatile memory devices 114 that are operated in parallel with each other. Also for example, the write data parity module 432 can be implemented with the control unit 202, the storage unit 204, the memory interface unit 206, and the host interface unit 208 for writing out the cache data 117 with the controller cache data parity 430.

The write in-progress operations module 402 can be coupled to the write local data module 404. The write local data module 404 can be coupled to the write parity local data module 406. The abort operations module 410 can be coupled to the generate parity module 414. The generate parity module 414 can be coupled to the write tabling meta-data module 420. The write tabling meta-data module 420 can be coupled to the write parity tabling and meta-data module 422. The controller signal start module 426 can be coupled to the store cache module 428. The store cache module 428 can be coupled to the write data parity module 432.

The storage system 100 is described with module functions or order as an example. The modules can be partitioned differently. Each of the modules can operate individually and independently of the other modules.

Furthermore, data generated in one module can be used by another module without being directly coupled to each other. Yet further, the modules can be implemented as hardware accelerators (not shown) within the control unit 202 or can be implemented as hardware accelerators (not shown) in the storage channel controller 112 or outside of the storage channel controller 112.

The physical transformation of executing the cache write command 324 based on the power failure signal 306 by sending the cache pages 330 from the adapter cache memory 108 to the storage channel controller 112, wherein the adapter cache memory 108 is a volatile memory results in movement in the physical world, such as people using the storage channel controller 112 in each of the storage device systems 106 based on the operation of the storage system 100. As the movement in the physical world occurs, the movement itself creates additional information that is converted back to generating the power failure signal 306 and generating the sleep signal 336 of FIG. 3 to shut down the host bus adapter 104, wherein the host bus adapter 104 interfaces with the storage channel controller 112 to write the cache pages 330 back to the adapter cache memory 108 upon powering up the host bus adapter 104 and the storage channel controller 112 for the continued operation of the storage system 100 and to continue the movement in the physical world.

Figure 5:
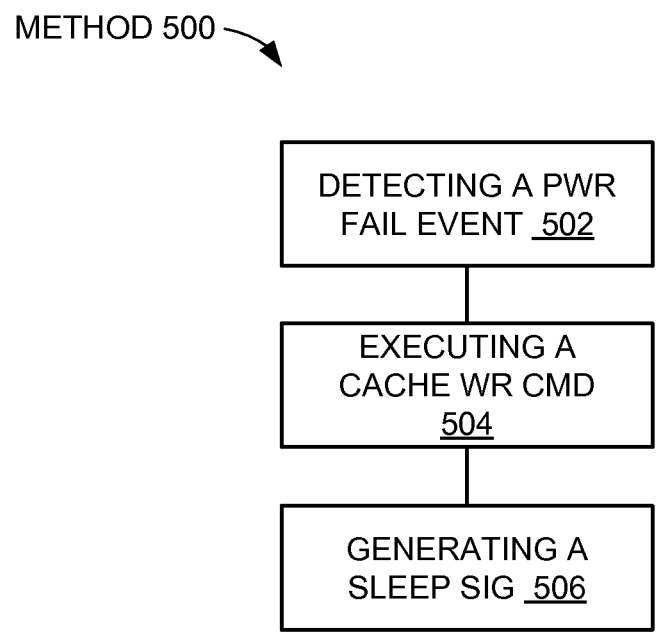
FIG. 5 is a flow chart of a method of data hardening in a storage system in a further embodiment of the present disclosure.

Referring now to FIG. 5, therein is shown a flow chart of a method 500 of data hardening in a storage system in a further embodiment of the present disclosure. The method 500 includes: detecting a power failure event in a block 502; executing a cache write command based on the power failure event to send a cache page from a cache memory to a storage channel controller, wherein the cache memory is a volatile memory in a block 504; and generating a sleep signal to shut down a host bus adapter, wherein the host bus adapter interfaces with the storage channel controller to write the cache page back to the cache memory upon a power up of the host bus adapter and the storage channel controller in a block 506.

Accordingly, it has been discovered that the present embodiments thus have numerous aspects.

One such aspect is that it has been found that the present embodiments provide host or Meta data transfers that are demarked by writing to a set of LBAs that are just above the logical address space of the SSD (storage device).

In the context mentioned above, the Host Meta Data is the data that has been cached in the HBA that has yet to be written to the flash controller. It includes both Host data and some LBA or addressing information as well. So, for the Host data or Meta data transfer, a signal is generated to indicate a start of transferring this special data, which is the cache data that has been in the HBA.

For example, if a disk drive is a one-hundred-Gigabyte drive, writing actually starts at the first LBA above a 100-Gigabyte level. Also for example, if a logical capacity of the drive includes the last address in the drive of 999, writing would start at address 1,000, which is one of the out-of-range logical block addresses 368, because of an LBA that is just out of the range of the normal logical address for the drive. In addition, the sub-drive or the storage device can indicate that an out of bounds address has been accessed and thus the Meta data from the HBA needs to be saved.

Another aspect is that it has been found that the present embodiments provide storage of host cache data in pre-allocated memory that has high data integrity and high bandwidth as compare with the bulk of the memory used on the SSDs (storage devices).

Another aspect is that it has been found that the present embodiments provide a mechanism to differentiate between writing of host data and writing of cached/meta-data to the storage device.

Another aspect is that it has been found that the present embodiments provide a mechanism to differentiate between reading of host data and reading of cached/meta-data to be returned and to the HBA for re-aggregation.

Another aspect is that it has been found that the present embodiments provide an approach to store a combination of HBA cache data/meta-data and the storage device's in-flight data and meta-data.

In the description above, the HBA cache data is data that is held in the HBA that has yet to be transmitted to the SSD. The in-flight data is data that is in the SSD that is associated with a response to the HBA. The response confirms that the SSD has the data and the data is safe, even though the data has not been written to the non-volatile memory including NAND. Such data is in a transition state indicating that it is in a data hardening process of being stored into the non-volatile memory.

Another aspect is that it has been found that the present embodiments provide a mechanism to increase the integrity of data hardening data and meta-data by providing a section of NVSTORE/NAND flash that has better data retention then normal NAND memory. For example, fast pages only in MLC or a channel or a set of channels that include SLC memory are used.

The term "retention" referred to herein is defined as an ability of memory cells to retain the programmed or correct information. Retention refers to an amount of correct data after a given period, which is a time when a drive is powered, not powered, or a combination thereof.

Another aspect is that it has been found that the present embodiments provide a mechanism to increase the integrity of data hardening data and meta-data by providing a RAID PARITY system that customizes the amount of data hardening operations.

Another aspect is that it has been found that the present embodiments provide a mechanism to change the amount of ECC protection for cache data or meta-data during the SCRAM or data hardening process.

Another aspect is that it has been found that the present embodiments provide sequencing the operations to the NAND flash to provide the maximum amount of overlap and time to transfer the cached host data/meta-data while there is still power on the NAND array of memory.

Values that the aspects and the embodiments described above include advantages of improved performance, improved reliability, improved data integrity, or a combination thereof. The embodiments described herein benefit all multi storage device implementations that require data hardening for a removal from storage device cache.

Thus, it has been discovered that the storage system 100 of FIG. 1 of the present disclosure furnishes important and heretofore unknown and unavailable solutions, capabilities, and functional aspects for data hardening in a storage system. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present disclosure is that it valuably supports and services the historical trend of reducing costs, simplifying systems, and increasing performance.

These and other valuable aspects of the present disclosure consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of data hardening in a storage system comprising:
    detecting a power failure event;
    executing a cache write command based on the power failure event to send a cache page from a cache memory to nonvolatile memory in the storage system, wherein the cache memory is volatile memory, wherein executing the cache write command includes writing the cache page and meta-data to nonvolatile memory in the storage system using logical block addresses outside a predetermined logical address space, and the predetermined logical address space includes logical addresses allocated for storing data during normal operation of the storage system; and
    generating a sleep signal to shut down a host bus adapter, wherein the host bus adapter interfaces with a storage channel controller to write the cache page back to the cache memory upon a power up of the host bus adapter and the storage channel controller.

2. The method as claimed in claim 1, further comprising aborting a read command upon detecting the power failure event.

3. The method as claimed in claim 1, wherein executing the cache write command includes executing the cache write command to write the cache page and the meta-data to fast pages of multi-level cell portions or single level cell portions of nonvolatile memory in the storage device.

4. The method as claimed in claim 1, further comprising generating a controller cache data parity to write to a nonvolatile memory device, wherein the controller cache data parity is for the cache page.

5. The method as claimed in claim 1, wherein executing the cache write command includes executing the cache write command to write scram data to a controller scram memory by the storage channel controller based on the cache page.

6. The method as claimed in claim 1, further comprising:
    aborting a read command upon detecting the power failure event; and
    aborting a wear leveling operation after aborting the read command.

7. The method as claimed in claim 1, wherein generating the sleep signal to shut down the host bus adapter comprises generating the sleep signal to shut down the host bus adapter after executing the cache write command.

8. The method as claimed in claim 1, further comprising:
    starting a timer upon detecting the power failure event, wherein the timer designates a period of time for write commands to send data to the nonvolatile memory in the storage system.

9. A storage system comprising:
    a cache memory configured to store a cache page, wherein the cache memory is volatile memory;
    a de-glitch module configured to detect a power failure event;
    a host bus adapter, coupled to the de-glitch module, wherein the host bus adapter includes:
        a write page module, coupled to the de-glitch module, the write page module configured to execute a cache write command based on the detected power failure event, wherein the executed cache write command writes the cache page and meta-data to nonvolatile memory in the storage system using logical block addresses outside a predetermined logical address space, and the predetermined logical address space includes logical addresses allocated for storing data during normal operation of the storage system; and
        a signal empty module, coupled to the write page module, the signal empty module configured to generate a sleep signal to shut down the host bus adapter; and
    a storage channel controller, coupled to the host bus adapter, the storage channel controller configured to receive the cache page and the meta-data from the cache memory and for an interface with the host bus adapter to write the cache page back to the cache memory upon a power up of the host bus adapter and the storage channel controller.

10. The system as claimed in claim 9, wherein the storage channel controller includes a controller abort read module, coupled to the de-glitch module, the controller abort read module configured to abort a read command based on the detected power failure event.

11. The system as claimed in claim 9, wherein the host bus adapter includes the write page module configured to execute the cache write command to write the cache page and the meta-data to fast pages of multi-level cell portions or single level cell portions of nonvolatile memory in the storage device.

12. The system as claimed in claim 9, wherein the storage channel controller includes a store cache module, coupled to the write page module, the store cache module configured to generate a controller cache data parity to write to a nonvolatile memory device, wherein the controller cache data parity is for the cache page.

13. The system as claimed in claim 9, wherein the signal empty module configured to generate the sleep signal to shut down the host bus adapter generates the sleep signal to shut down the host bus adapter after the cache write command is executed.

14. The system as claimed in claim 9, wherein the storage channel controller includes:
    a controller abort read module, coupled to the de-glitch module, the controller abort read module configured to abort a read command based on the detected power failure event; and
    a stop recycle module, coupled to the controller abort read module, the stop recycle module configured to abort a wear leveling operation after the read command is aborted.

* * * * *